US009860158B2

(12) United States Patent
Ueda et al.

(10) Patent No.: US 9,860,158 B2
(45) Date of Patent: Jan. 2, 2018

(54) PATH INFORMATION EXCHANGE METHOD, COMMUNICATION NODE, COMMUNICATION SYSTEM, AND COMMUNICATION NODE PROGRAM

(71) Applicant: NEC Corporation, Minato-ku, Tokyo (JP)

(72) Inventors: Hirofumi Ueda, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 33 days.

(21) Appl. No.: 14/767,136

(22) PCT Filed: Mar. 4, 2014

(86) PCT No.: PCT/JP2014/055367
§ 371 (c)(1),
(2) Date: Aug. 11, 2015

(87) PCT Pub. No.: WO2014/136740
PCT Pub. Date: Sep. 12, 2014

(65) Prior Publication Data
US 2015/0381471 A1 Dec. 31, 2015

(30) Foreign Application Priority Data

Mar. 5, 2013 (JP) ................................. 2013-042876

(51) Int. Cl.
*H04L 12/715* (2013.01)
*H04W 40/32* (2009.01)

(52) U.S. Cl.
CPC .............. *H04L 45/04* (2013.01); *H04L 45/46* (2013.01); *H04L 45/64* (2013.01); *H04W 40/32* (2013.01)

(58) Field of Classification Search
None
See application file for complete search history.

(56) References Cited

U.S. PATENT DOCUMENTS 6,026,077 A  *  2/2000  Iwata ...................... H04L 45/04
                                                            340/2.23
7,177,295 B1 *  2/2007  Sholander ............... H04L 45/30
                                                            370/338
(Continued)

FOREIGN PATENT DOCUMENTS

CN     101436980 A     5/2009
JP     H10-032572 A    2/1998
(Continued)

OTHER PUBLICATIONS

Extended European Search Report for EP Application No. EP14759859.3 dated Aug. 9, 2016.
(Continued)

*Primary Examiner* — Andrew Lai
*Assistant Examiner* — Jamaal Henson

(57) ABSTRACT

The purpose of the present application is to provide a technique for the exchange of path information between different routing domains, which, while reducing the exchange of useless path information in the stage for constructing a hierarchical structure, can maintain robustness of path recognition that tolerates network partition. Of the management communication node identifiers which are described in hierarchical information included in a path control message received from a neighboring communication node and in hierarchical information held by the local communication node and which indicate a communication node that manages each level of the hierarchicalized network structure, the identifier indicating the highest level communication node and the identifier indicating the transmission source communication node are used to identify whether the routing domain to which the aforementioned neighboring communication node belongs is the same as the routing domain of the local communication node, and if the routing domain to which the aforementioned neighboring (Continued)

communication node belongs is different from the routing domain of the local communication node, the path information held by the local communication node is made known.

8 Claims, 22 Drawing Sheets

(56) References Cited

U.S. PATENT DOCUMENTS

| | | | |
|---|---|---|---|
| 2002/0012320 A1* | 1/2002 | Ogier | H04L 1/1614 370/252 |
| 2002/0062388 A1* | 5/2002 | Ogier | H04L 45/26 709/238 |
| 2003/0172362 A1* | 9/2003 | Mack-Crane | H04J 3/14 370/254 |
| 2004/0081152 A1 | 4/2004 | Thubert et al. | |
| 2005/0254473 A1 | 11/2005 | Preguica et al. | |
| 2005/0265259 A1 | 12/2005 | Thubert et al. | |
| 2006/0227724 A1 | 10/2006 | Thubert et al. | |
| 2014/0328338 A1 | 11/2014 | Ueda et al. | |

FOREIGN PATENT DOCUMENTS

| | | |
|---|---|---|
| JP | 2008-205890 A | 9/2008 |
| WO | 2009/078427 A1 | 6/2009 |
| WO | 2013/076912 A1 | 5/2013 |

OTHER PUBLICATIONS

International Search Report for PCT Application No. PCT/JP2014/055367, dated May 27, 2014.
English translation of Written opinion for PCT Application No. PCT/JP2014/055367.
Chinese Office Action for CN Application No. 201480012758.5 dated Jun. 22, 2017 with English Translation.

* cited by examiner

| DESTINATION HIERARCHICAL ADDRESS | Next hop | ARRIVAL PROBABILITY |
|---|---|---|
| C | 192.168.3.1 | 0.8 |
| C-1 | 192.168.3.16 | 0.8 |
| C-2 | 192.168.3.32 | 0.6 |
| A | 192.168.3.16 | 0.5 |
| A-1 | 192.168.3.32 | 0.4 |

| DESTINATION HIERARCHICAL ADDRESS | Next hop IP ADDRESS |
|---|---|
| A | 192.168.1.1 |
| A-b | 192.168.1.16 |
| A-c | 192.168.2.32 |
| A-b-1 | 192.168.1.16 |
| A-c-1 | 192.168.2.32 |

RT100m

US 9,860,158 B2

PATH INFORMATION EXCHANGE METHOD, COMMUNICATION NODE, COMMUNICATION SYSTEM, AND COMMUNICATION NODE PROGRAM

This application is a National Stage Entry of PCT/JP2014/055367 filed on Mar. 4, 2014, which claims priority from Japanese Patent Application 2013-042876 filed on Mar. 5, 2013, the contents of all of which are incorporated herein by reference, in their entirety.

TECHNICAL FIELD

The present invention relates to a route information exchange method, a communication node, a communication system, and a program of a communication node.

BACKGROUND ART

In recent years, MANET (Mobile Ad-hoc Network) has been spotlighted as a communication means in a remote place with no network infrastructure and at the time of disaster, and it is required to enable operation in a wide range and large scale environment in which a plurality of communication terminals participate, similarly to the network infrastructure.

However, in the MANET, since communication nodes (communication terminals) directly communicate with each other in a wireless manner, communication interference occurs by communication electric waves of respective communication terminals participating in a network and an available communication band is limited. Further, the communication electric waves do not reach by movement of the communication terminals or electric wave interruption due to an obstacle, so that a communication link between the communication terminals may be frequently interrupted, and the network may be separated. In this regard, for example, Patent Literature 1 discloses a technology capable of highly reliable sending of data between ends even though connectivity between wireless ad-hoc networks or between nodes is not stable.

CITATION LIST

Patent Literature

[PTL 1] International Publication Pamphlet No. 2009-078427

SUMMARY OF INVENTION

Technical Problem

However, in the aforementioned technology, a network is constructed by a plurality of communication terminals and the amount of route information required for communication and indicating a communication route to a destination communication terminal becomes enormous. Further, respective communication terminals exchange an enormous amount of route information, so that a band available by the communication terminals becomes narrower.

Furthermore, in an environment in which a communication band available by configuring the aforementioned wide range of network by using a plurality of nodes becomes narrow and the network is separated,
condition 1 of scalability for preventing an increase in route information and
condition 2 of robustness of route recognition for permitting separation of a network
are required for a management method of the route information. However, in existing MANET and DTN (Delay-Tolerant Network) routing, it is difficult to simultaneously satisfy the condition 1 and the condition 2.

In this regard, an object of the present invention is to provide a route information exchange method capable of maintaining robustness of route recognition for permitting separation of a network while reducing wasteful exchange of route information in a step of constructing a hierarchical structure with respect to exchange of route information between different routing domains.

Solution to Problem

The invention to solve the above problems is a route information exchange method including: a communication node identifies whether a routing domain to which an adjacent communication node belongs is a routing domain of its own communication node by using an identifier indicating a communication node of the uppermost layer and an identifier indicating a transmission source communication node among management communication node identifiers, which are written in hierarchical information included in a route control message received from the adjacent communication node and hierarchical information held by its own communication node and indicate communication nodes that manage each layer of a hierarchical network structure; and the communication node advertises route information held by its own communication node when the routing domain to which the adjacent communication node belongs is different from the routing domain of its own communication node.

The invention to solve the above problems is a communication system including: an identification means that identifies whether a routing domain to which an adjacent communication node belongs is a routing domain of its own communication node by using an identifier indicating a communication node of the uppermost layer and an identifier indicating a transmission source communication node among management communication node identifiers, which are written in hierarchical information included in a route control message received from the adjacent communication node and hierarchical information held by its own communication node and indicate communication nodes that manage each layer of a hierarchical network structure; and an advertisement means that advertises route information held by its own communication node when the routing domain to which the adjacent communication node belongs is different from the routing domain of its own communication node.

The invention to solve the above problems is a program of a communication node causing the communication node to serve as an identification means that identifies whether a routing domain to which an adjacent communication node belongs is a routing domain of its own communication node by using an identifier indicating a communication node of the uppermost layer and an identifier indicating a transmission source communication node among management communication node identifiers, which are written in hierarchical information included in a route control message received from the adjacent communication node and hierarchical information held by its own communication node and indicate communication nodes that manage each layer of a hierarchical network structure, and an advertisement means that advertises route information held by its own communication node when the routing domain to which the adjacent communication node belongs is different from the routing domain of its own communication node.

Advantageous Effects of Invention

The effect of the present invention is reducing wasteful exchange of route information between different routing domains in a step of constructing a hierarchical structure in a network,

BRIEF DESCRIPTION OF DRAWINGS

FIG. 15 is a diagram for explaining route information of a routing domain.

DESCRIPTION OF EMBODIMENTS

An exemplary embodiment of the present invention will be described in detail with reference to the drawings. Firstly, a premise in the present application will be described.

Normally, in a DTN technology, as the timing at which the exchange of route information is performed, the time at which different routing domains have been detected is employed as the timing at which the exchange of route information is performed in the DTN technology. Hereinafter, an example of the timing will be described.

Figure 1:
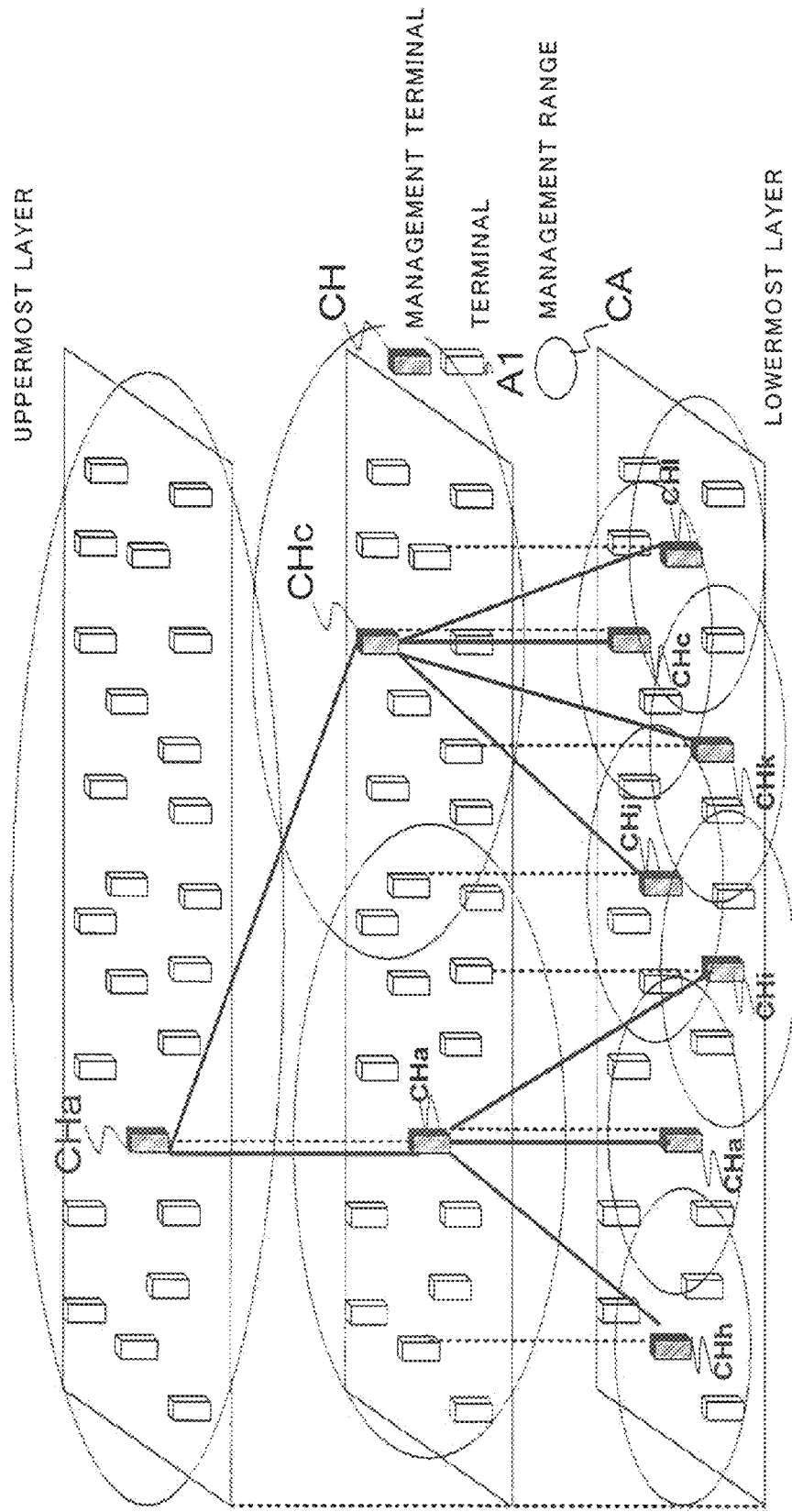
FIG. 1 is a diagram for explaining a hierarchical structure in the present application.

When communication terminals that advertise route information belong to the same routing domain (the same hierarchical structure), a hierarchical structure illustrated in FIG. 1 is constructed on the basis of hierarchical routing of a MANET technology, and a management terminal CH manages other communication terminals in a management range CA. In this way, destinations of a plurality of communication terminals are concentrated to one management terminal.

Figure 2:
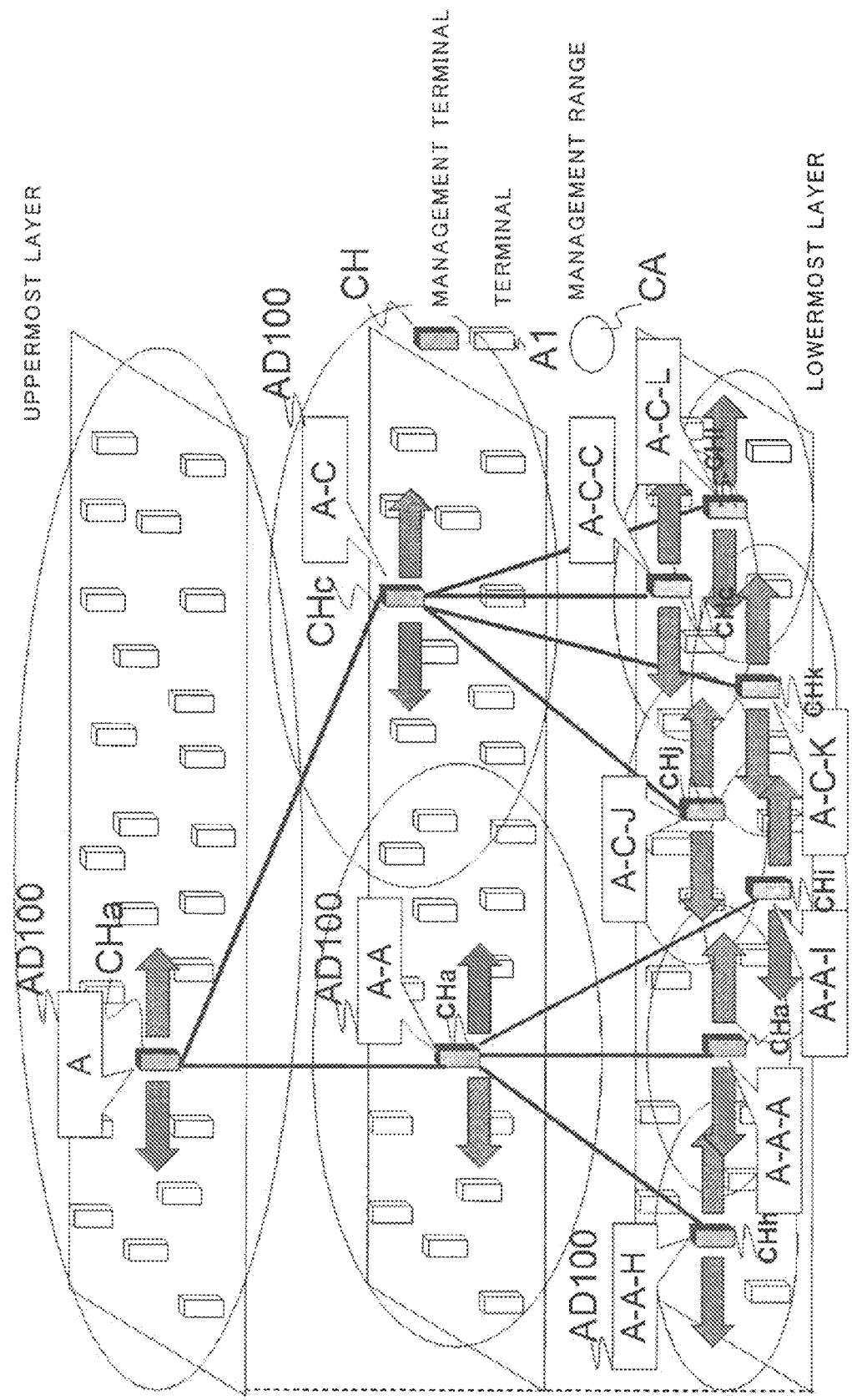
FIG. 2 is a diagram for explaining a hierarchical structure in the present application.

Further, as illustrated in FIG. 2, the management terminal CH regularly advertises hierarchical information (a hierarchical address AD100) on a position of its own terminal to the management range CA as route information, thereby allowing the route information to be scalable. In contrast, when the communication terminals belong to routing domains different from each other (hierarchical structures different from each other), the management terminal CH advertises routes to the different routing domains (the different hierarchical structures) to other communication terminals by using an exchange method of route information in the DTN routing of the DTN technology as illustrated in FIG. 3.

Figure 3:
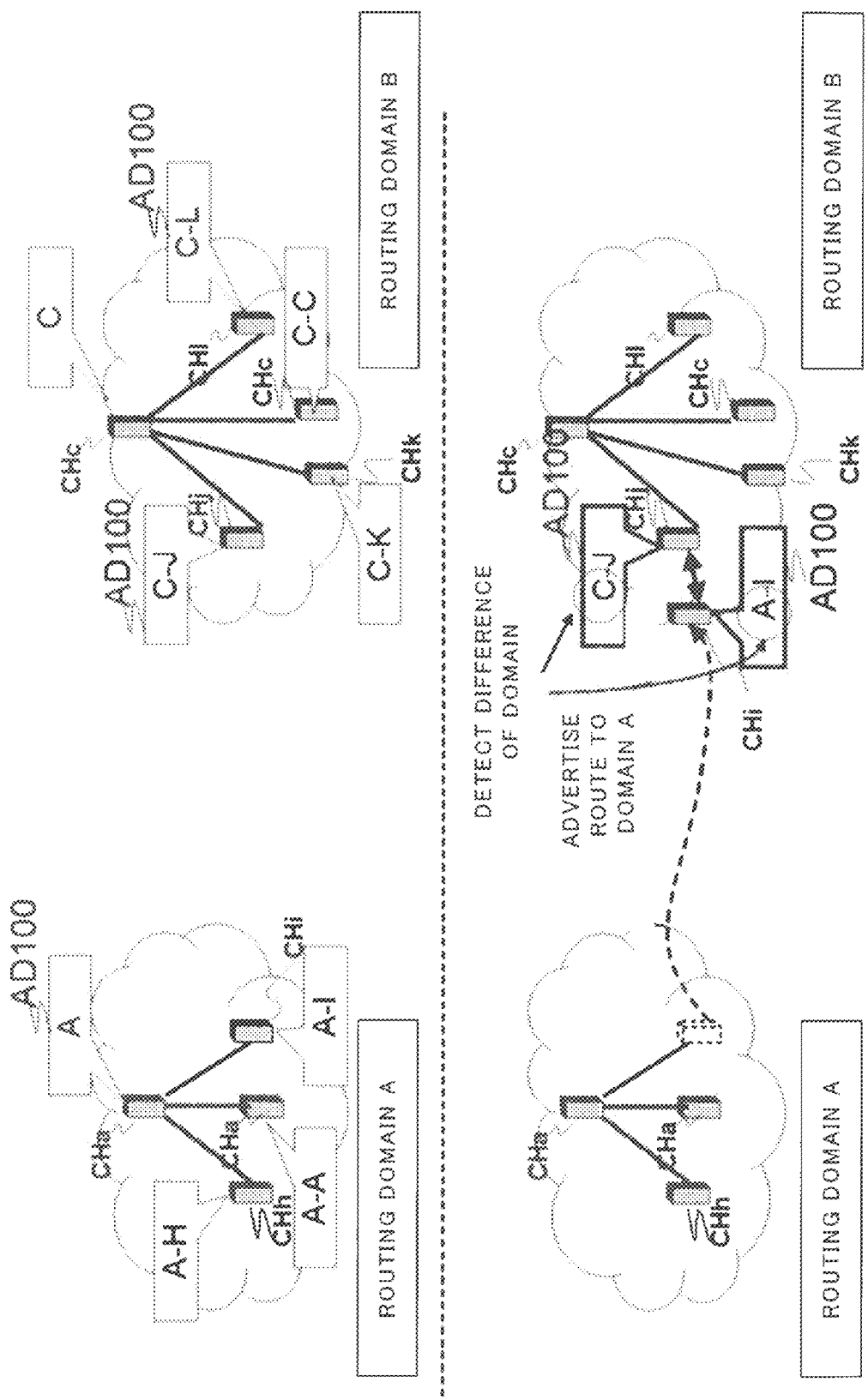
FIG. 3 is a diagram for explaining a routing domain in the present application.

As illustrated in FIG. 3, the management terminal CH compares identifiers indicating communication terminals of the uppermost layer of the hierarchical address AD100 advertised to neighboring communication terminals with each other, detects a difference of routing domains, and determines the timing at which the exchange of the route information based on the DTN technology is performed. In this way, when the neighboring communication terminals are determined to belong to the same routing domain as that of its own communication terminal, the management terminal CH uses the MANET technology, and when the neighboring communication terminals are determined to belong to a routing domain different from that of its own communication terminal, the management terminal CH determines it as the timing at which the exchange of the route information of the DTN technology is performed. As a consequence, it is possible to enable the compatibility of condition 1 of scalability for preventing an increase in route information and condition 2 of robustness of route recognition for permitting separation of a network.

Herein, the premise of the aforementioned method is that the construction of a hierarchical structure of a network is converged, in other words, a change in a routing domain is stable. Therefore, in a step of constructing the hierarchical structure, a problem occurs in the exchange of the route information in the aforementioned method.

Figure 4:
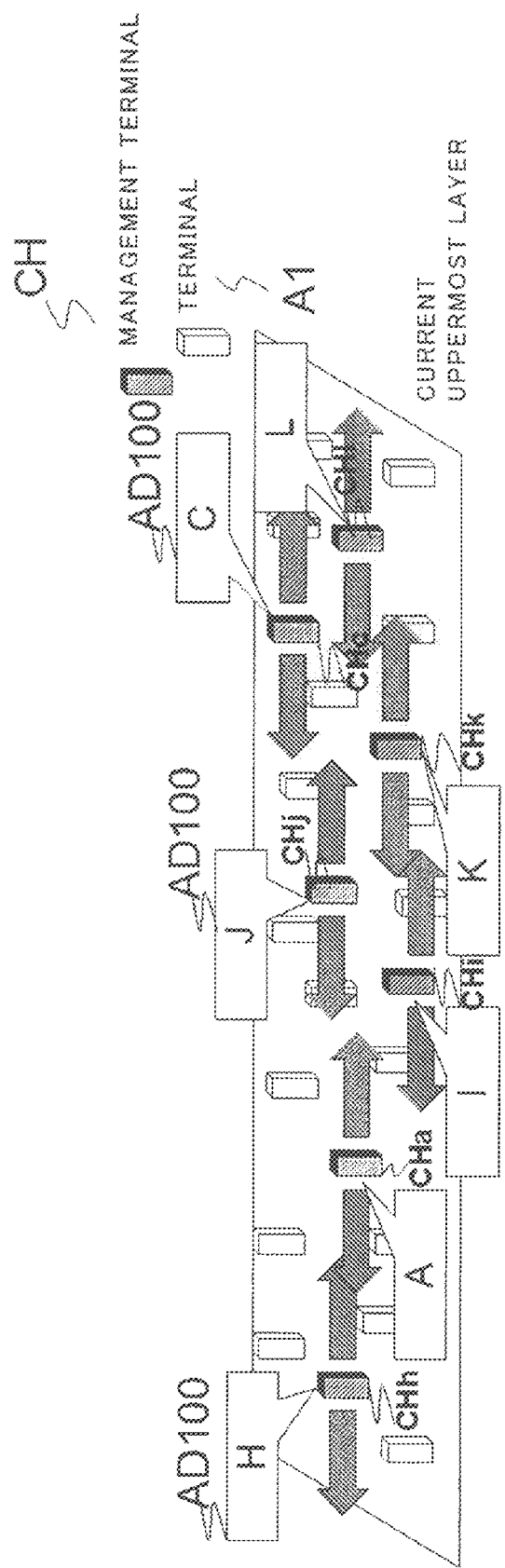
FIG. 4 is a diagram for explaining a hierarchical structure in the present application.

For example, since the uppermost management terminal is temporarily generated and changed many times in a step in which a hierarchical structure is being constructed, the hierarchical address AD100 used in detecting a "different routing domain" is considered to be also changed many times in a similar manner. As illustrated in FIG. 4, in a step in which the construction of a hierarchical structure has started, since there is no upper management terminal, identifiers of respective management terminals have only been put into hierarchical addresses AD100 of respective management terminals. Then, as illustrated in FIG. 5, by hierarchical addresses of communication terminals (a terminal CHa and a terminal CHc) temporarily serving as the uppermost management terminal during the construction of the hierarchical structure, the hierarchical addresses of communication terminals CHh to CH1 of a lower layer of those communication terminals are changed.

Figure 5:
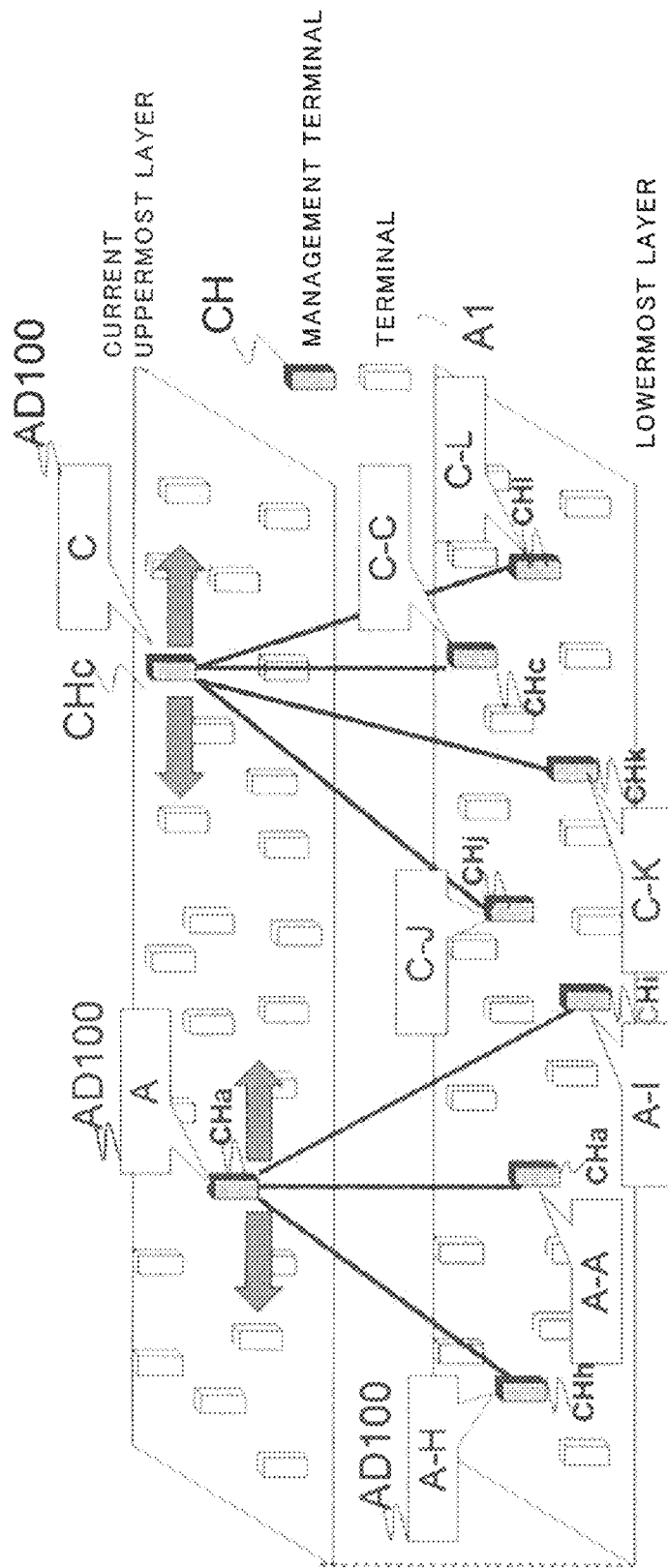
FIG. 5 is a diagram for explaining a hierarchical structure in the present application.
Figure 6:
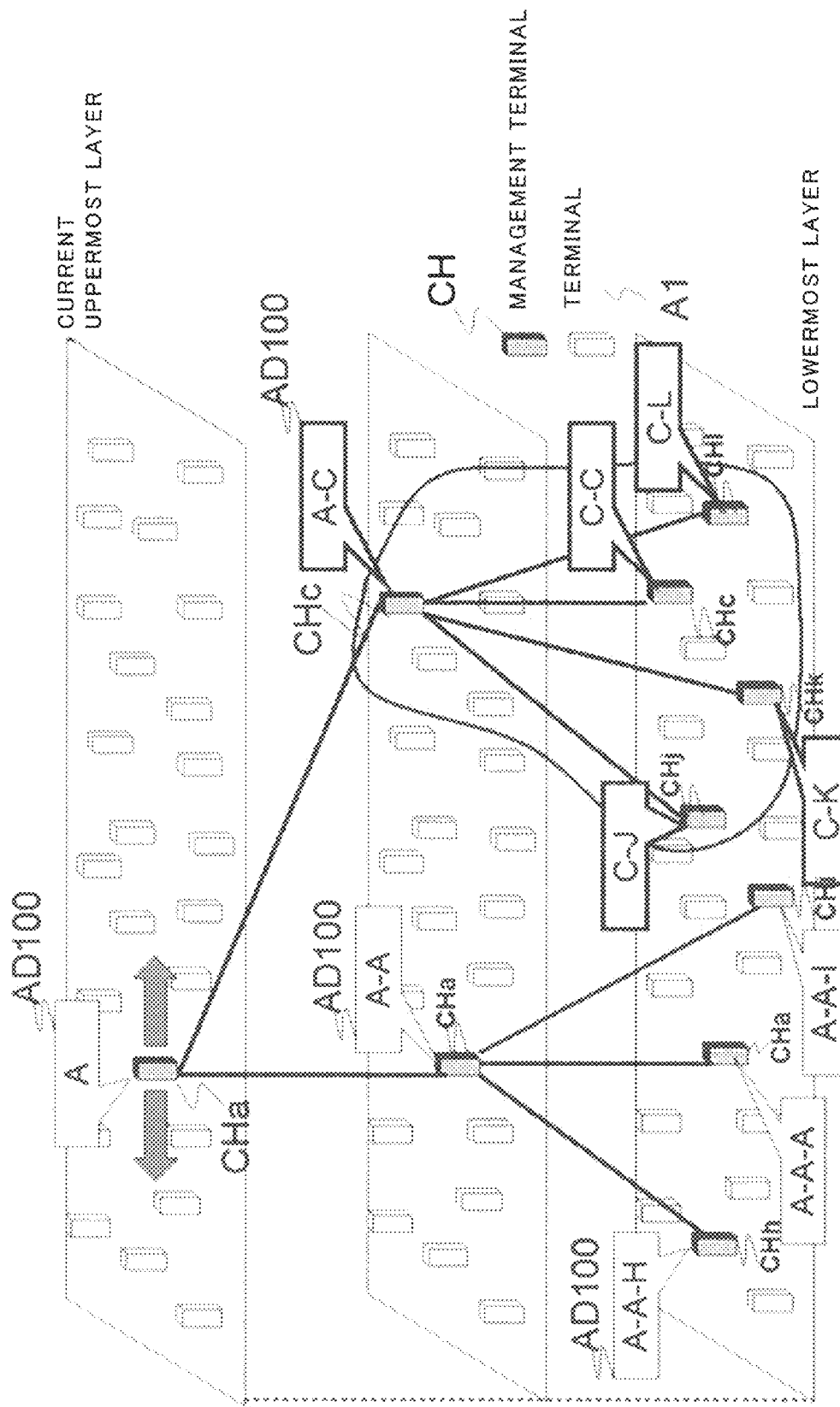
FIG. 6 is a diagram for explaining a hierarchical structure in the present application.

Further, in order to create a complete tree structure, the construction of a hierarchical structure is further performed, and the uppermost management terminal is decided from the upper management terminals CHa and CHc of the aforementioned communication terminals (FIG. 6). In FIG. 6, by the communication terminal CHa newly serving as the uppermost management terminal, the hierarchical address of the hierarchical structure is newly updated, and a hierarchical address managed by the communication terminal CHc having temporarily served as the uppermost management terminal in FIG. 5 becomes different, so that hierarchical addresses of management terminals (shadow zones of FIG. 6) subordinate to the communication terminal CHc are also changed.

The hierarchical address of the communication terminal CHc having temporarily served as the uppermost management terminal in FIG. 5 is changed to "A-C" obtained by adding the identifier of the upper communication terminal CHa of the communication terminal CHc. Further, when the communication terminal CHc has advertised the updated hierarchical address of its own communication terminal, a communication terminal CHj of the communication terminals CHj to CH1 subordinate to the communication terminal CHc, for example, detects that an identifier of a part "C" indicating the uppermost layer of hierarchical addresses "C to J" of its own communication terminal recognized up to now is different from an identifier of a part "A" indicating the uppermost layer of newly received hierarchical addresses "A to C".

As a consequence, when a hierarchical address of an upper management terminal has been updated, a management terminal positioned at a lower layer of the management terminal determines that a new hierarchical address advertised by the upper management terminal is different from a hierarchical address recognized by its own terminal up to now, that is, determines that the new hierarchical address is a message from a different routing domain, and performs the exchange of route information using the DTN technology.

Figure 7:
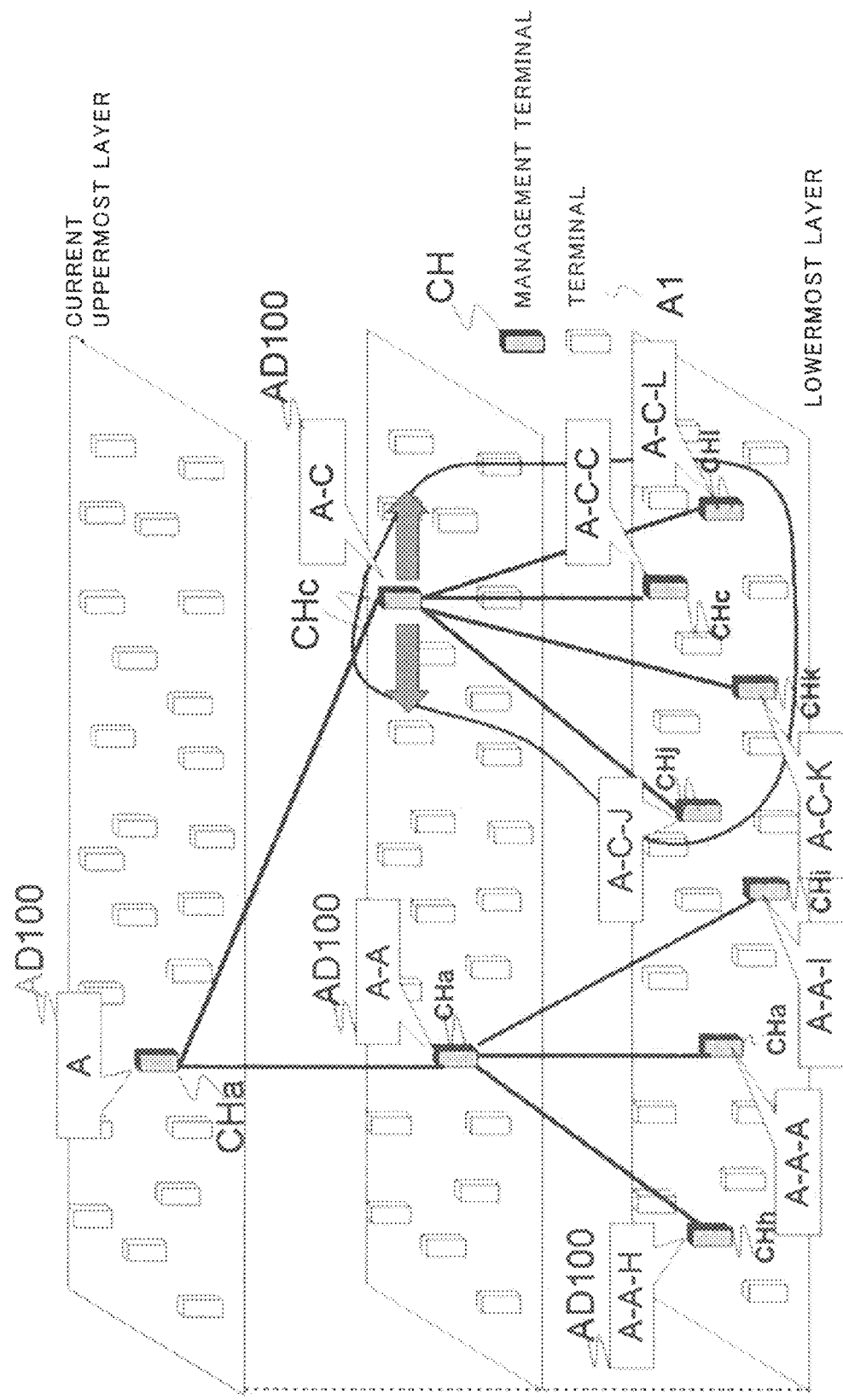
FIG. 7 is a diagram for explaining a hierarchical structure in the present application.

Actually, a hierarchical address of a hierarchical structure to which its own communication terminal belongs has been merely updated, and finally, as illustrated in FIG. 7, convergence to one hierarchical structure (one routing domain) is made. Therefore, it is not necessary to exchange the route information using the DTN technology. The aforementioned update of the hierarchical structure is a process repeated many times whenever a new layer is generated until a hierarchical structure is constructed as a tree structure in which the uppermost management terminal is employed as a vertex, and wasteful exchange of route information is generated at all such times. Hereinafter, a method for preventing the wasteful exchange of the route information will be described.

[Description of Configuration]

Figure 8:
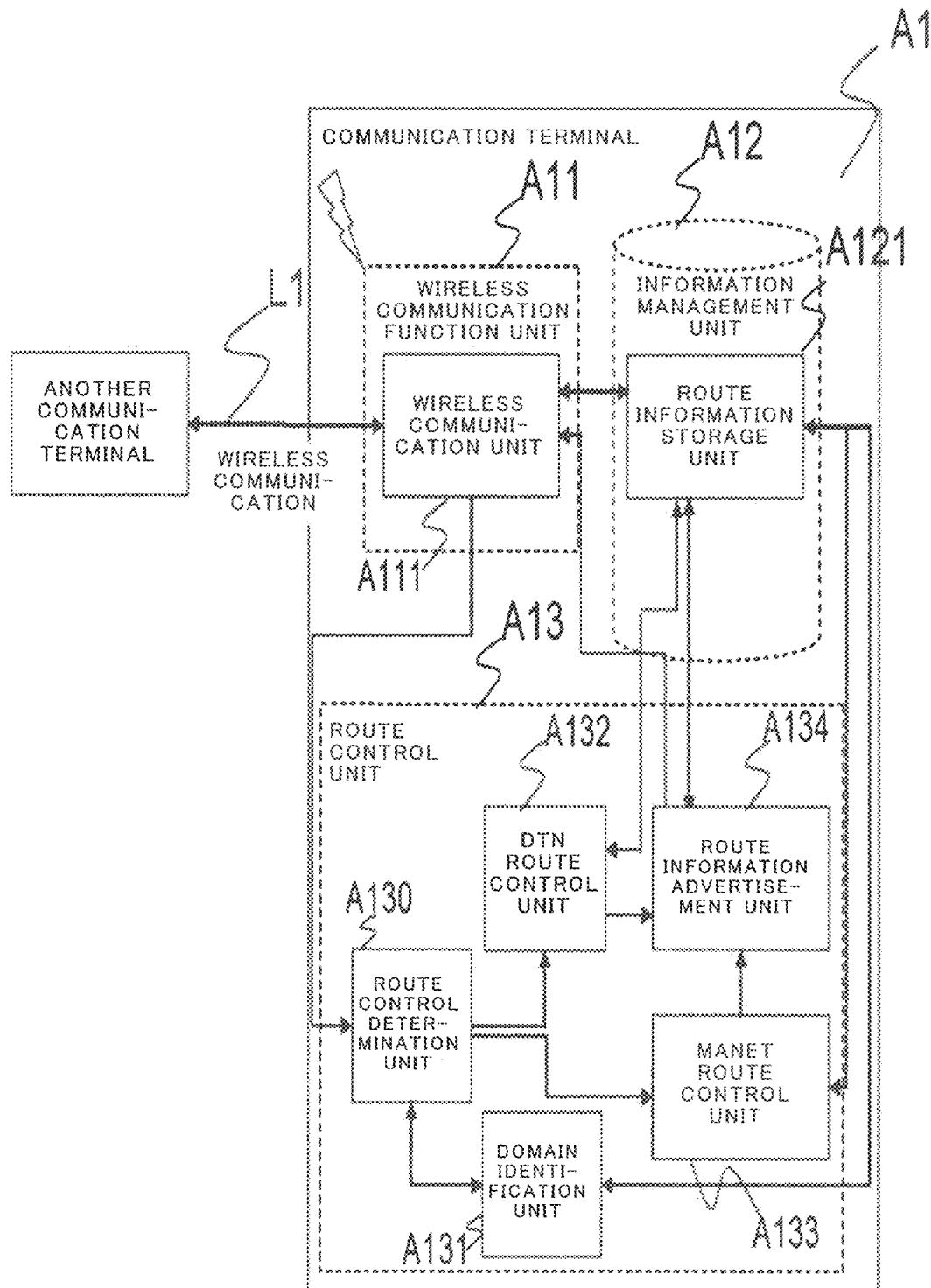
FIG. 8 is a diagram illustrating an example of a configuration of the present application.
Figure 9:
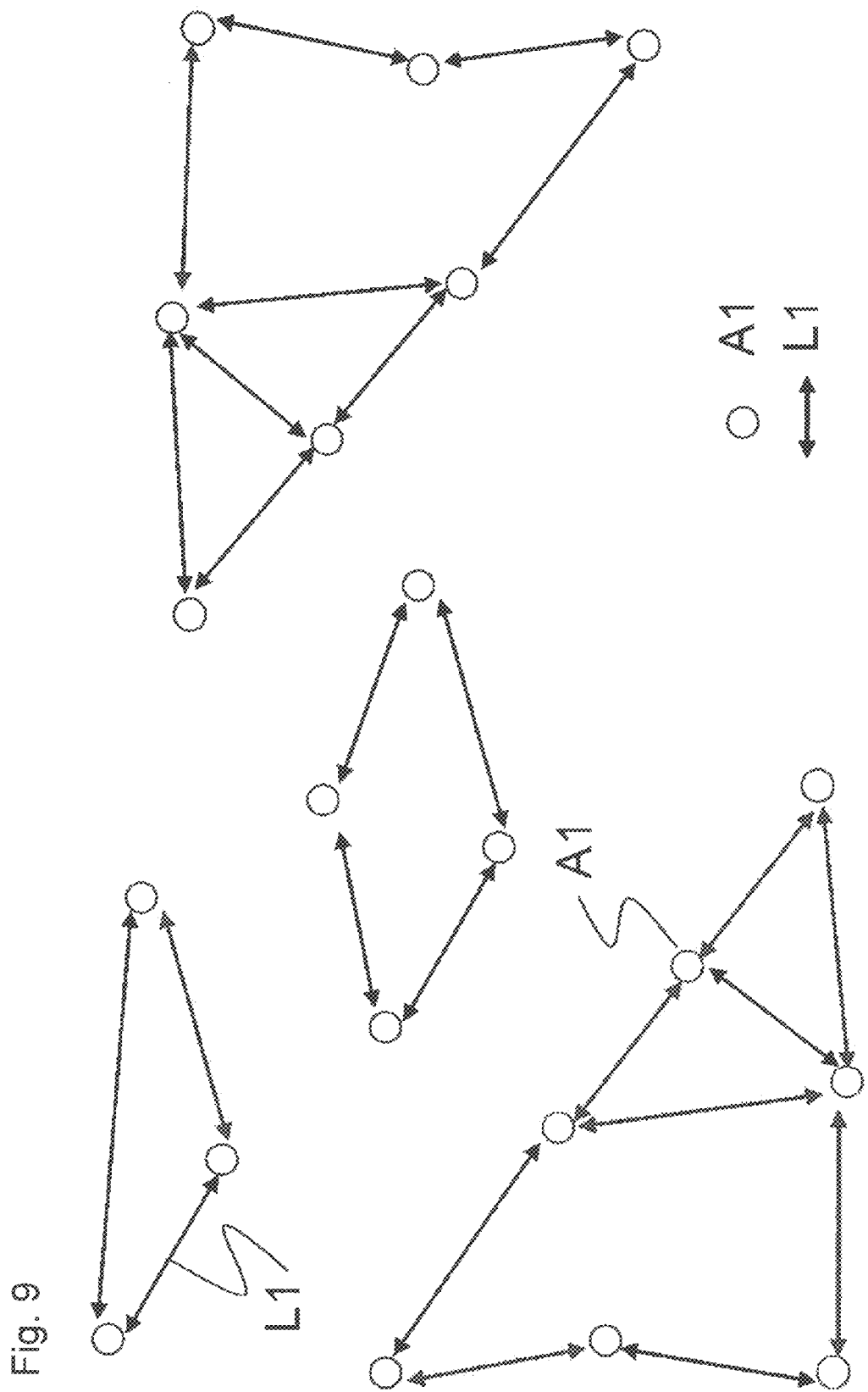
FIG. 9 is a diagram illustrating an example of a network of the present application.

Referring to FIG. 8, an exemplary embodiment of the present invention includes a plurality of communication terminals A1 each having a wireless communication function unit A11 that wirelessly communicates with another communication terminal, an information management unit A12 that manages holding information of a communication terminal (node), and a route control unit A13 that controls route information for performing communication with a destination communication terminal. As illustrated in FIG. 9, the communication terminals A1 are connected to one another through wireless communication L1 performed by the wireless communication function units A11 to construct a plurality of MANETs (Mobile Ad-hoc Networks), so that an environment including the plurality of MANETs is created. At this time, the communication terminals in the network may also be in a moved state or stopped state.

Figure 10:
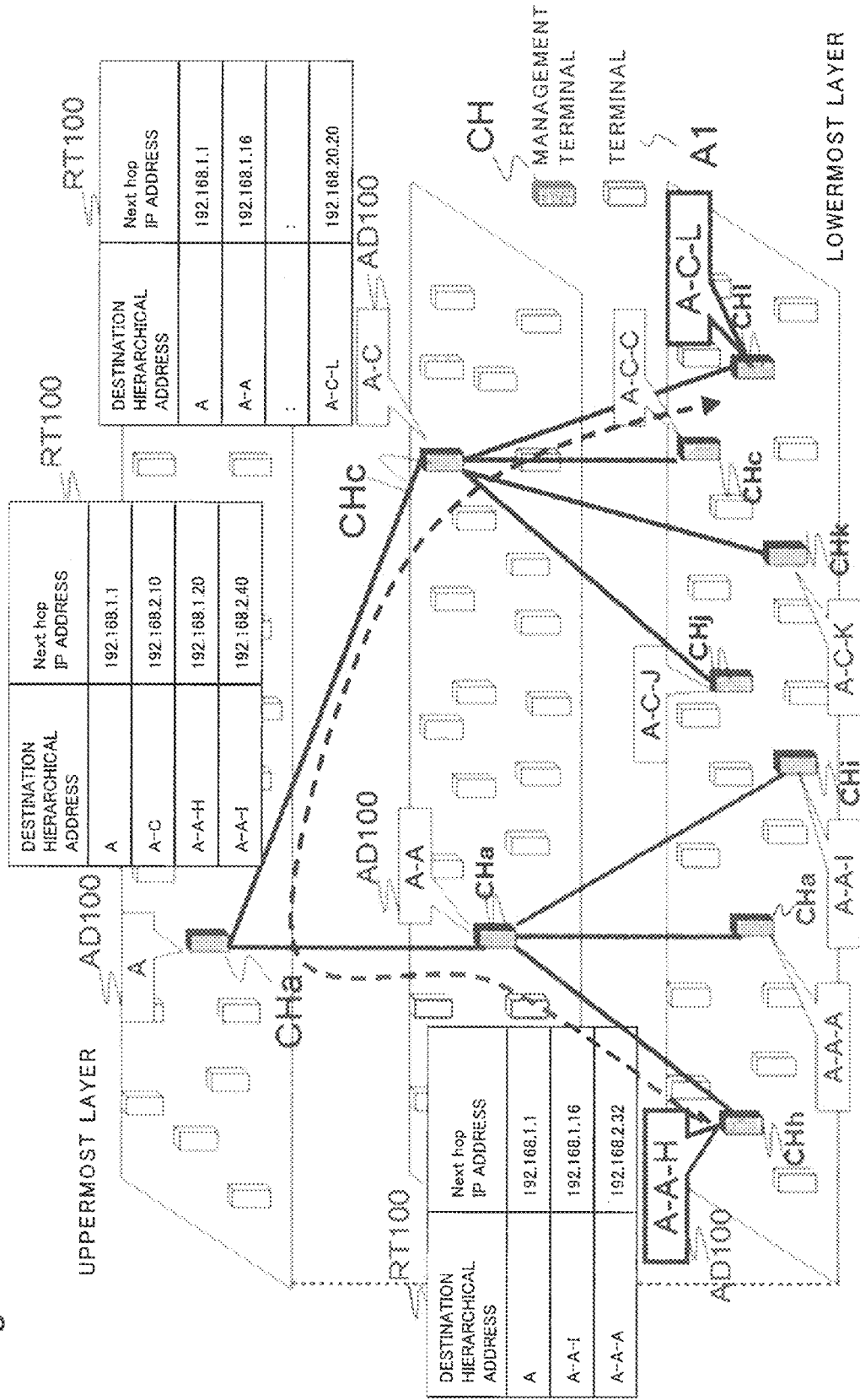
FIG. 10 is a diagram for explaining route control.

Moreover, respective communication terminals perform the construction of a hierarchical structure and route management based on hierarchical routing for concentrating and reducing route information, which is a route control technology of MANET illustrated in FIG. 10.

Figure 11:
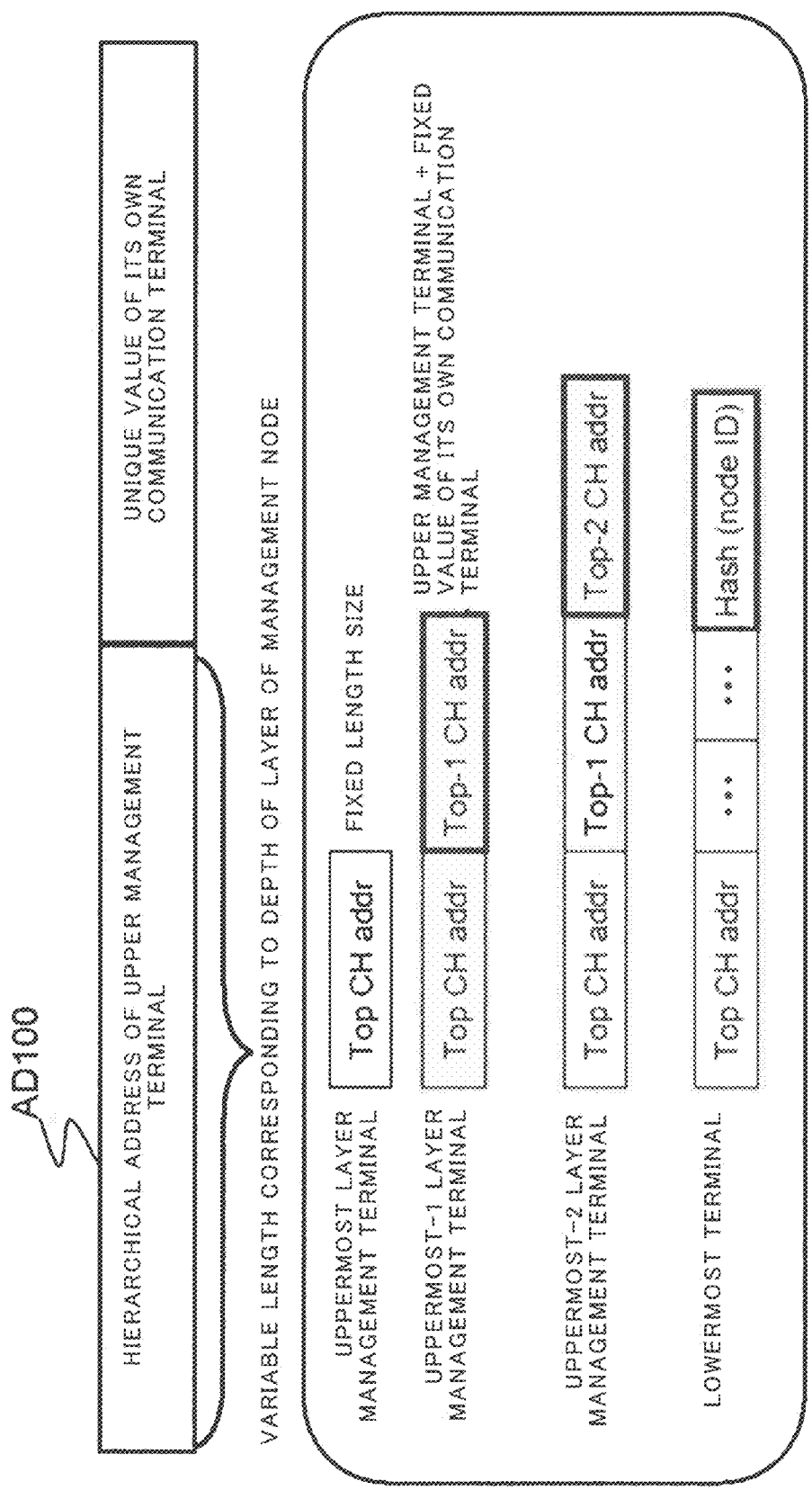
FIG. 11 is a diagram for explaining a route control message.

In the present exemplary embodiment, in the clustering, as illustrated in FIG. 10, a network connection range is defined as one routing domain and unique hierarchical information (a hierarchical address AD100) is allocated to each management terminal CH of each layer. The hierarchical address AD100 is generated on the basis of a generation rule according to a hierarchical structure as illustrated in FIG. 11, and the hierarchical address AD100 of each layer in the hierarchical structure includes a hierarchical address of an upper management terminal that manages the layer. Further, its own hierarchical address is obtained by adding a unique value (an identifier) of its own communication terminal to an end of the hierarchical address, and is recursively generated toward the lowermost terminal from a management terminal of the uppermost layer (FIG. 2). Therefore, it also serves as an identifier indicating a vertical relation of each layer of the hierarchical structure.

The management terminal CH that manages each layer of the hierarchical structure writes a hierarchical address of its own communication terminal in a route control message D100 as hierarchical information of the layer, and notifies neighbor communication terminals of the route control message D100 as a route control message D100h with the written hierarchical address. In this way, the communication terminal can construct and maintain a hierarchical structure and create a routing table of the hierarchical structure. Further, respective communication terminals perform routing based on the hierarchical address when performing communication with other communication terminals.

In the hierarchical routing, as illustrated in FIG. 10, for example, the communication terminal CHh selects an entry with the written longest-match hierarchical information from route information RT100 held by its own communication terminal on the basis of a hierarchical address A-C-L of a destination communication terminal, and transmits information to a transmission source communication terminal of the information. This procedure is recursively repeated in a communication terminal serving as a transfer route, so that the information can arrive at a communication terminal having the hierarchical address of the destination communication terminal.

The wireless communication function unit A11 includes a wireless communication unit A111.

The wireless communication unit A111 has a function of transmitting a route control message (in which the hierarchical address AD100 has been written, and route information RT100m of its own routing domain and route information RT100d of another routing domain have been written) received from the information management unit A12 or a route information advertisement unit A134 and information of another communication terminal, or of receiving information from the other communication terminal. Further, the wireless communication unit A111 also has a function of delivering the route control message D100 to the route control determination unit A130 of the route control unit A13 when the route control message D100 has been received from the other communication terminal.

The information management unit A12 includes a route information storage unit A121.

The route information storage unit A121 has a function of storing a route control message D100d of another routing domain and the route information RT100d of the other routing domain received from a DTN route control unit A132 of the route control unit A13 and a route control message D100m of its own routing domain and the route information RT100m of its own routing domain received from a MANET route control unit A133, and has a function of responding with corresponding route information and route control message when a reading request of route information has been received from the route control determination unit A130, the DTN route control unit A132, the MANET route control unit A133, and the route information advertisement unit A134.

The route control unit A13 includes the route control determination unit A130, a domain identification unit A131, the DTN route control unit A132, the MANET route control unit A133, and the route information advertisement unit A134.

The route control unit A130 has a function of receiving the route control message D100 from the wireless communication unit A11, determining whether the route control message D100 is the route control message D100h with the written hierarchical address AD100 of another communication terminal or a route control message with the written route information RT100d of another routing domain transmitted by the DTN route control unit A132 of another communication terminal, distributing the received route control message D100 to the DTN route control unit A132 and the MANET route control unit A133, and determining a route control unit to be performed.

In relation to the identification of the received route control message D100 performed by the route control determination unit A130, various methods are considered. For example, an identifier when a hierarchical address has been written and an identifier when route information have been written may be written in a message type field of a route control message exchanged between communication terminals, thereby determining whether the hierarchical address or the route information has been written in the route control message. Otherwise, the route control determination unit A130 may also determine that the route control message is a notification message of the route control message D100h with the written hierarchical address when one hierarchical address has been written in the route control message, and that the route control message is a notification message of the route information RT100d when two or more hierarchical addresses have been written in the route control message.

When it is determined that the route control message is the route control message D100h with the written hierarchical address, the route control determination unit A130 notifies the domain identification unit A131 of the received route control message D100, and determines whether the route control message relates to its own hierarchical structure (its own routing domain) or another hierarchical structure (another routing domain). When it is the route control message D100m related to its own hierarchical structure, the route control determination unit A130 delivers the route control message D100 only to the MANET route control unit A133. When it is the route control message D100d related to the other hierarchical structure, the route control determination unit A130 delivers the route control message D100 to both the DTN route control unit A132 and the MANET route control unit A133, and performs a route control process in the DTN route control unit A132 and a hierarchical structure construction process in the MANET route control unit A133. Further, when route information has been written in the received route control message D100, the route control determination unit A130 delivers the route control message D100 to the DTN route control unit A132.

When the route control message D100h with the written hierarchical address of the other communication terminal is received from the route control determination unit A130, the domain identification unit A131 has a function of determining whether it is the route control message D100m related to its own hierarchical structure (its own routing domain) or the route control message D100d related to the other hierarchical structure (the other routing domain).

For example, the domain identification unit A131 reads hierarchical information of its own routing domain (a hierarchical address AD100n of its own communication terminal) and hierarchical information (a hierarchical address group AD110) of another communication terminal recognized by its own communication terminal from the route information storage unit A121, and compares the two types of hierarchical information with the hierarchical information of the route control message D100h with the written hierarchical address received from the route control unit A130, thereby identifying whether the route control message D100 received by its own communication terminal is the route control message D100m related to its own routing domain or the route control message D100d related to the other routing domain.

In the route control message D100h with the written hierarchical address, a unique value (an identifier) AD100s of the transmission source communication terminal of the message has been written at an end portion of the hierarchical address AD100 in the route control message D100h as illustrated in FIG. 2 and FIG. 11. On the other hand, at a front portion thereof, a unique value (an identifier) AD100t of the uppermost management terminal managing a current hierarchical structure has been written. By using these identifiers, the domain identification unit A131 performs identification of the received route control message D100h as follows.

Figure 12:
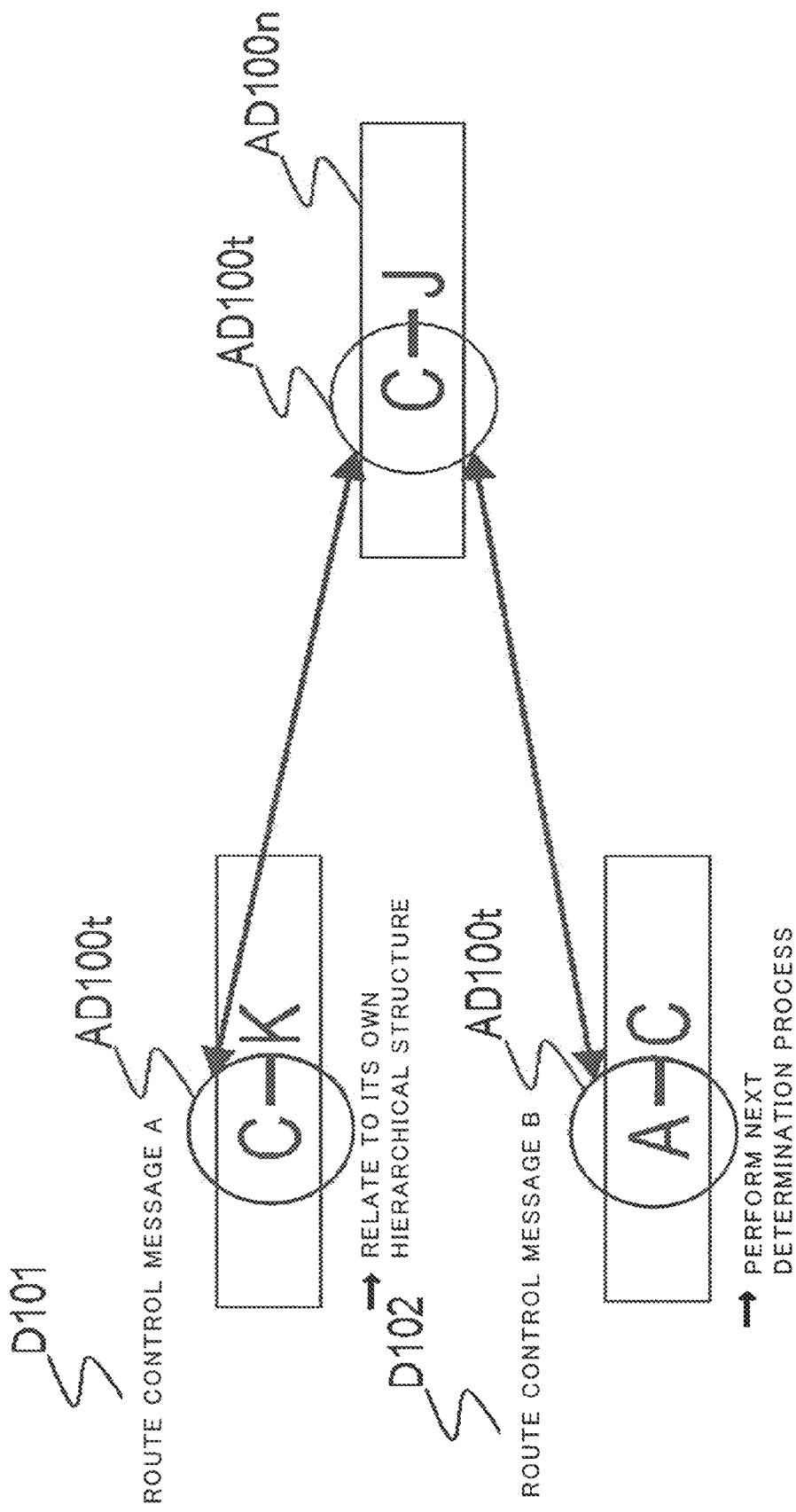
FIG. 12 is a diagram for explaining a part indicating the uppermost layer of a hierarchical address of a route control message.

Firstly, with respect to an identifier written at a part (the identifier AD100t of the front portion of the hierarchical address) indicating the uppermost layer of the hierarchical address, the domain identification unit A131 compares places of the hierarchical address written in the received route control message D100 with the written hierarchical address and the hierarchical address AD100n of its own communication terminal (FIG. 12).

As with a route control message D101 of FIG. 12, when identifiers of parts indicating the uppermost layer coincide with each other, since the uppermost management terminals managing hierarchical structures of both communication terminals are equal to each other, the received route control message D100h with the written hierarchical address and its own communication terminal belong to the same hierarchical structure. Therefore, the domain identification unit A131 determines that the received route control message D100h with the written hierarchical address relates to the routing domain of its own communication terminal. On the other hand, as with a route control message D102 of FIG. 12, when identifiers do not coincide with each other, the domain identification unit A131 performs the following determination.

Figure 13:
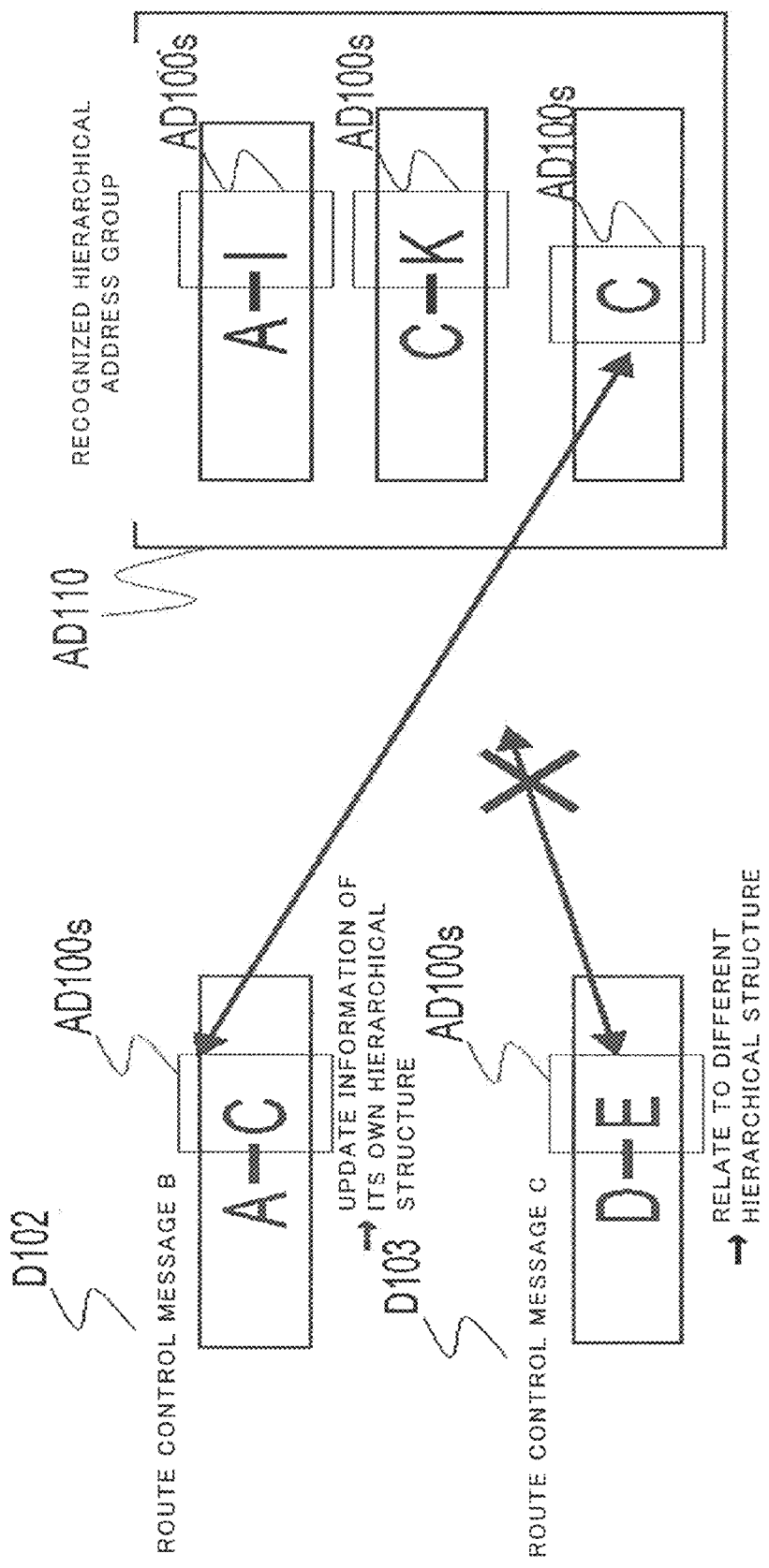
FIG. 13 is a diagram for explaining an end of a route control message.

When the identifiers do not coincide with each other in the aforementioned determination, the domain identification unit A131 compares places of the hierarchical address written in the received route control message D100 with the hierarchical address group AD110 of the other communication terminal recognized by its own communication terminal with respect to the identifier AD100s written at the end portion of the hierarchical address (FIG. 13).

As with a route control message D102 of FIG. 13, when identifiers written at end portions coincide with each other, the domain identification unit A131 recognizes the received route control message D100h with the written hierarchical address as a route control message with a written hierarchical address transmitted to its own communication terminal by an already known communication terminal, that is, an updated hierarchical address of the communication terminal, and determines that the route control message D100h is a message related to the routing domain of its own communication terminal. On the other hand, as with a route control message D103 of FIG. 13, when identifiers do not coincide with each other, since it is the route control message with the written hierarchical address transmitted to its own communication terminal by the already known communication terminal, the domain identification unit A131 determines that the route control message D100h is a message related to another routing domain.

In this way, the domain identification unit A131 can identify the received route control message D100, thereby determining whether the received route control message relates to its own routing domain, particularly, it is update information related to a specific communication terminal. Otherwise, in the identification method described in the aforementioned example, an order is not particularly decided, and an order may be changed or determination may be separately performed, and determination based on only a result may also be performed. Further, as described below, in order to reduce the exchange of route information, new determination may also be added.

Additional determination conditions are provided to a message determined as a route control message with a written hierarchical address from an unknown communication terminal, so that a situation in which the message is determined as a message from another routing domain may be reduced and the exchange of route information may also be reduced.

For example, there is considered a method for performing determination by focusing on the depth of a layer of a hierarchical structure as well as the hierarchical address AD100. As a notification method of a hierarchical address, it is possible to consider a method in which a hierarchical address with which a hierarchical management terminal is positioned is not notified and a layer (a hierarchical level HL100) at which its own terminal is positioned from the lowermost layer is notified, and it is also possible to consider a determination method using the hierarchical level. The domain identification unit A131 may also perform determination based on the hierarchical level HL100, thereby further performing determination regarding whether a message is a route control message related to another routing domain.

Figure 14:
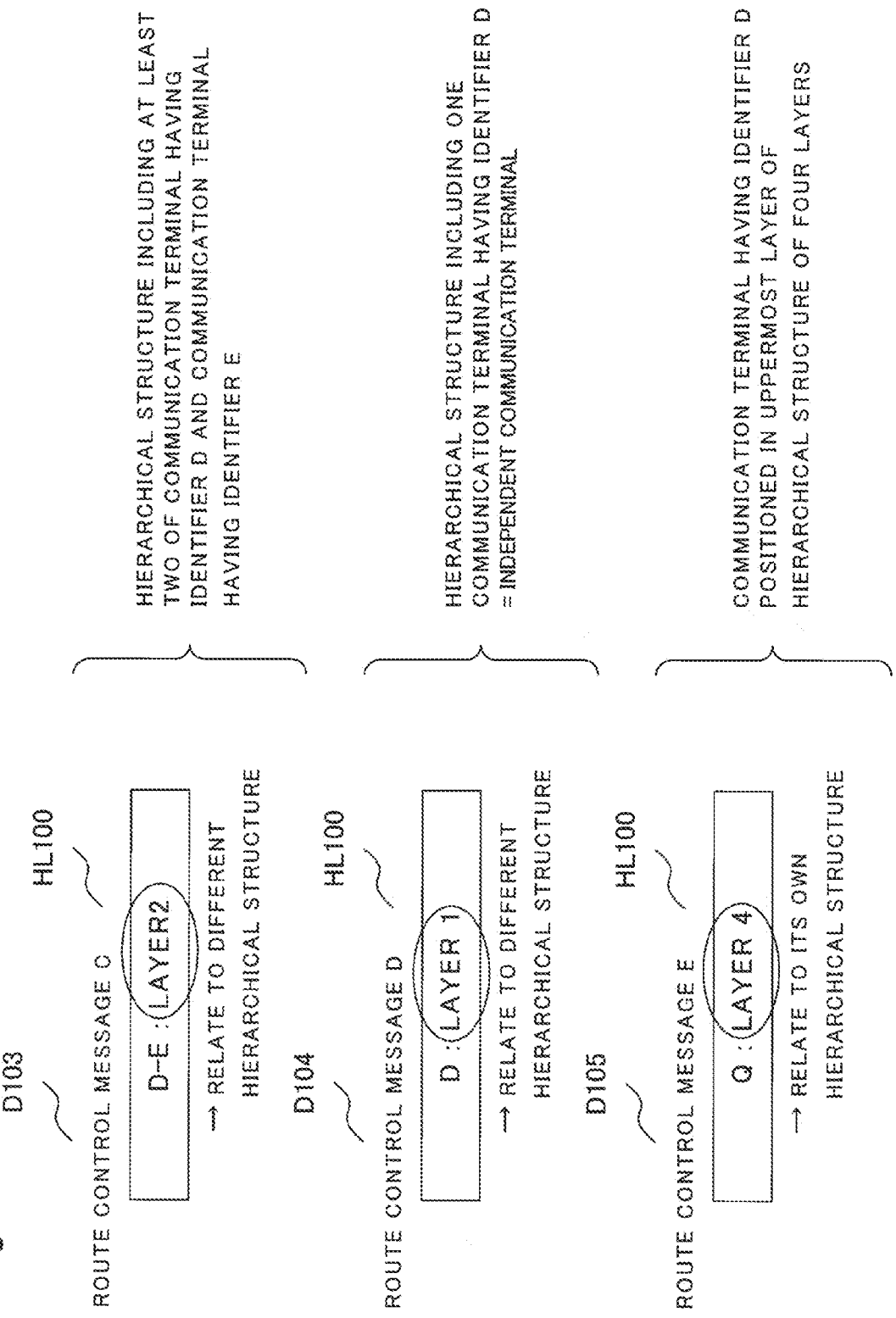
FIG. 14 is a diagram for explaining a route control message using a hierarchical level.

From a route control message D103 illustrated in FIG. 14, by using a hierarchical level, it is understood that a hierarchical structure used by the received route control message includes at least two hierarchical management terminals having an identifier D and an identifier E. Moreover, it is also understood that the message transmission source terminal is a communication terminal having the identifier E. Therefore, the domain identification unit A131 determines that MANET is constructed with a plurality of communication terminals, and may also determine another routing domain in order to perform the exchange of route information.

Further, from a route control message D104, by information written in the received route control message, it is understood that a hierarchical structure has one layer and the message transmission source terminal is positioned in the uppermost layer. Accordingly, the message transmission source terminal is determined as a separate or independent communication terminal. In an environment in which such a communication link has been disconnected, in order to enable routing, the exchange of route information of the DTN technology is required. Thus, the domain identification unit A131 may also determine another routing domain and perform the exchange of route information.

From a route control message D105, by information written in the received route control message, it is understood that a hierarchical structure has four layers and the message transmission source terminal is positioned in the uppermost layer. Accordingly, it is understood that a large scale of MANET has been constructed. However, it is considered that the uppermost management terminal is changed many times in a step of constructing a hierarchical structure. Therefore, when route information is exchanged on the basis of a route control message transmitted by the uppermost management terminal, since wasteful exchange of route information occurs, the domain identification unit A131 determines that the received route control message is the route control message D100m related to its own routing domain, and a method for suppressing the exchange of route information based on the DTN technology is considered.

In the case of receiving a route control message such as the route control message D105, since a large scale of MANET has been constructed, the domain identification unit A131 receives a message such as the route control message D103 from another communication terminal, and the exchange of required route information is possible when performing the exchange of route information at this time.

When the route control message D100d of the other routing domain other than the routing domain to which its own communication terminal belongs or the route information RT100d of the other routing domain is received from the route control determination unit A130, the DTN route control unit A132 has a function of newly adding a route entry as route information to the other routing domain or updating the entry when there are the same other routing domain and a route entry in a routing table, and storing route information in the route information storage unit A121.

For example, the DTN route control unit A132 reads route information of another routing domain recognized up to now from the route information storage unit A121, adds the route control message D100d and the route information RT100d of the other routing domain received from the route control determination unit A130 with respect to the read route information to the route information of the other routing domain by setting the aforementioned route control message and the hierarchical address AD100 and the transmission source communication terminal (a transmission source IP address) written in the routing table as route information, or updates an already existing route entry, and then stores the route information in the route information storage unit A121.

At this time, in order to the update route information of the other routing domain, various methods can be considered. For example, differently from a route to a communication terminal in a routing domain (MANET) of its own communication terminal, communication is not always possible when a communication request has been generated. Therefore, similarly to a management method of a routing table in an existing DTN technology, there is considered a method in which the route information of the other routing domain includes a destination hierarchical address, a communication terminal of a next hop serving as a transfer destination, and arrival probability from the communication terminal of the next hop to a destination communication terminal, and a transmission source communication terminal when the route information of the other routing domain has been received is managed as a communication terminal capable of most reliably sending information to a communication terminal written the routing domain.

Further, with respect to communication to the other routing domain, the communication terminal holds transfer data until a communication terminal capable of sending data from its own communication terminal to a destination appears, so that communication between other routing domains is realized. Moreover, the communication terminal may also add information of the number of transfer hops up to now, period of validity of a route entry, and a registration time as well as the arrival probability the destination communication terminal, and may also manage route control more accurately.

Further, when the route control message D100$d$ of the other routing domain has been received from the route control determination unit A130, the DTN route control unit A132 has a function of comparing the received route control message D100$d$ of the other routing domain and the route information RT100$d$ with a route control message of another routing domain recorded up to now or route information of the other routing domain, determining whether its own communication terminal holds route information and a route control message to be advertised to another communication terminal, and advertising the route information and the route control message.

For example, in the case of holding route information of a routing domain different from the routing domain written in the received route control message and route information, or holding information with a new update date, the DTN route control unit A132 transmits these route information to the domain identification unit A131 as advertisement information D200 in addition to the route information of its own routing domain, and advertises the advertisement information D200 to other communication terminals.

At this time, there is considered that recorded route control message or route information is advertised as is, or the fact that the route control message with the written information is not a route control message used in the construction of a hierarchical structure is set in the aforementioned message type field such that the route control message does not have an influence on the construction of the hierarchical structure performed by the MANET route control unit A133 and the route control message is transmitted.

Moreover, there is considered that when the recorded route control message and route information of another routing domain are retransmitted, a resultant obtained by subtracting reliability (arrival probability) of the written route information from a reception time of its own communication terminal on the basis of a passage time is advertised. On the other hand, there is also considered that when route information of another routing domain and route information of its own routing domain are advertised, as described above, similarly to the route management method of the DTN technology, arrival probability of a route is added or revised on the basis of a passage time from an update time of the information previous time, and these route information is advertised.

Further, in relation to determination regarding information to be advertised to another communication terminal, various methods are considered. For example, when it is intended to reduce an information exchange amount, there is considered a method in which a route control message of a routing domain to which its own communication terminal belongs or only route information is advertised, or a method in which all route information of a routing domain different from a routing domain of a received route control message is not delivered, and at least one of route information with arrival probability of 60% or more considered to be invalid is selected for delivery on the basis of reliability (arrival probability) of route information.

On the other hand, in order to recognize many routes, among information held by the route information storage unit A121, all of a route control message of a routing domain different from a routing domain of a received route control message and route information may also be employed as the advertisement information D200.

The MANET route control unit A133 has a function of controlling a hierarchical structure in a routing domain on the basis of the route control message D100 received from the route control determination unit A130. In the present exemplary embodiment, in order to use a route control algorithm based on a hierarchical structure of a network, when the hierarchical address AD100, which is information of a hierarchical structure of its own communication terminal, has been changed, the MANET route control unit A133 transmits a route control message with a written new hierarchical address to another communication terminal. The MANET route control unit A133 performs the transmission of the route control message by transmitting the route control message D100 to be transmitted as the advertisement information and an advertisement request thereof to the route information advertisement unit A134.

Moreover, when the route control message D100 is received from the route control determination unit A130, the MANET route control unit A133 has a function of updating the route information RT100$m$ of its own routing domain or newly adding route information written in the route control message, and storing the updated route information in the route information storage unit A121.

Figure 16:
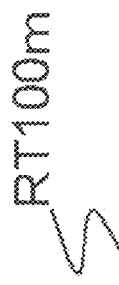
FIG. 16 is a diagram for explaining route information of its own routing domain.

For example, the MANET route control unit A133 reads route information of a routing domain to which its own communication terminal belongs from the route information storage unit A121, and when a route entry of the route information is equal to the hierarchical address written in the route control message received from the route control determination unit A130, the MANET route control unit A133 updates the route entry of the routing table, and when the route entry is not equal to the hierarchical address, the MANET route control unit A133 newly adds a route entry, thereby managing the route information RT100$m$ of its own routing domain as illustrated in FIG. 16.

At this time, in the case of identifying the new and the old of the route entry and managing the shortest route entry, a creation date of an entry, a sequence number of a received route control message, the number of transfer hops and the like may also be added in addition to the information of FIG. 16. By these information, it is possible to more accurately manage a valid route of MANET.

When a routing table has been updated, the updated route information of its own routing domain is delivered to and stored in the route information storage unit A121. Further, when update of route information occurs and it is necessary to advertise the updated route information to other communication terminals in a routing domain to which its own communication terminal belongs, the MANET route control unit A133 may also transmit the updated route information and an advertisement request to the route information advertisement unit A134 as the advertisement information D200.

The route information advertisement unit A134 has a function of transmitting the route control message D100 to other communication terminals through the wireless communication unit A111 in order to regularly recognize a route in a routing domain, and generating a route control message including the advertisement information D200 and advertising the route control message to the other communication terminals through the wireless communication unit A111 when an advertisement request of the advertisement information D200 is received from the DTN route control unit A132 and the MANET route control unit A133. At this time, respective identifiers may also be written in the message type field of the route control message such that it is understood that the information written in the route control message is notification of only route information to another routing domain by the DTN route control unit A132, or a route control message with a written hierarchical address or route information.

In relation to advertisement information to other communication terminals, the route information advertisement unit A134 may also read information instructed by the DTN route control unit A132 and the MANET route control unit A133 from the route information storage unit A121, and advertise the read information to the other communication terminals through the wireless communication unit A111.

[Description of Operation]

Next, with reference to FIG. 17 to FIG. 21, an operation for reducing wasteful exchange of route information in the present exemplary embodiment will be described.

Figure 17:
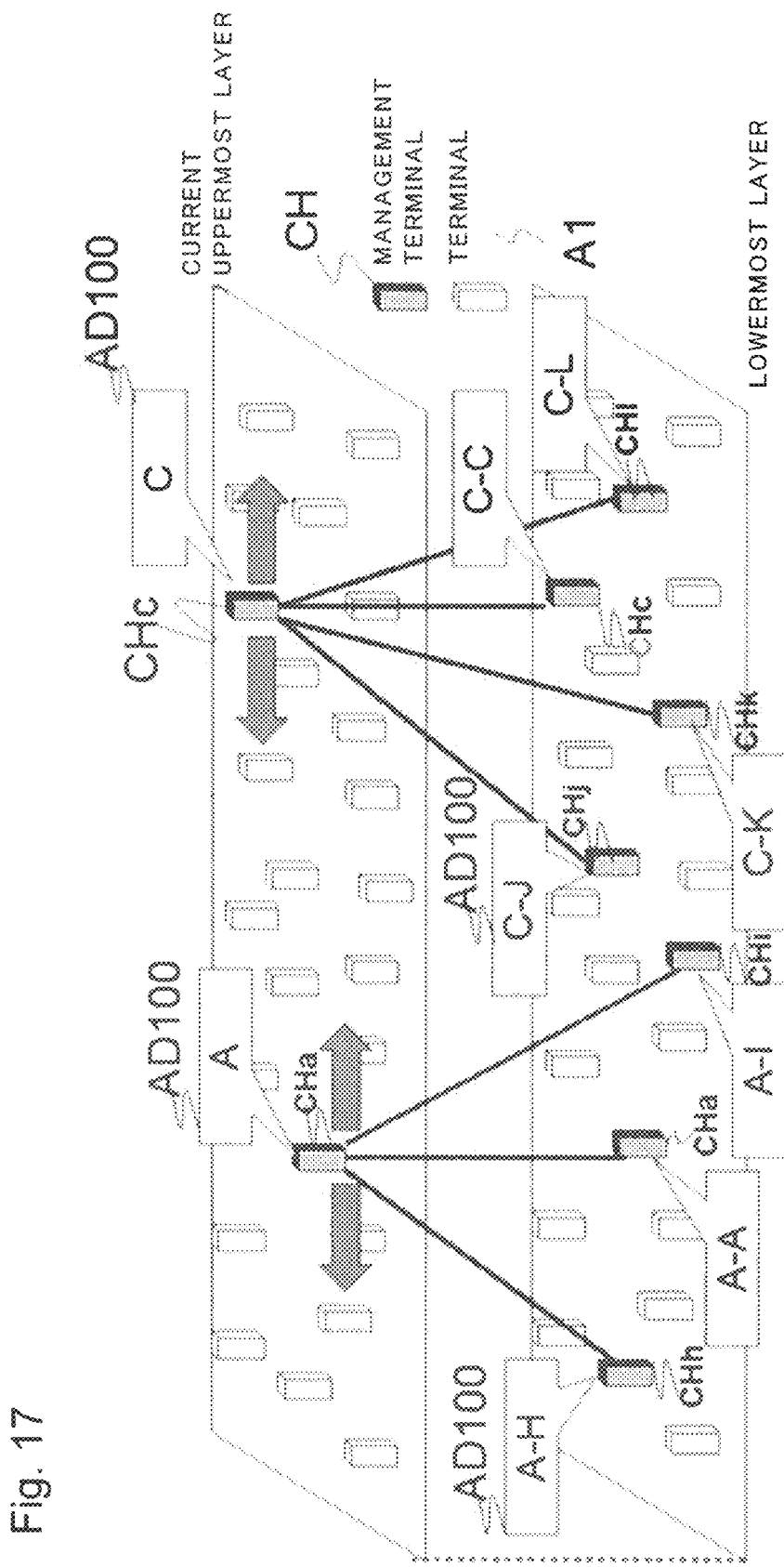
FIG. 17 is a diagram for explaining state transition of a hierarchical structure in the present application.

A communication terminal CHa, a communication terminal CHc, and communication terminals CHh to CH1 illustrated in FIG. 17 perform relay and multihop transfer of transmission data among communication terminals, and thus exist in a communicable range among the communication terminals. Further, it is assumed that a hierarchical structure according to a hierarchical routing process of the MANET technology is being constructed. In FIG. 17, the communication terminal CHa and the communication terminal CHc temporarily exist as the uppermost management terminal, other management terminals of a lower layer exist as terminals managed by the two management terminals, and a terminal A1 not serving as a management terminal of any layer is managed by these management terminals.

In the present exemplary embodiment, in order to facilitate a description, there are originally many communication terminals, other hierarchical structures in other routing domains, and the like; however, in order to facilitate a description, they are omitted for simplification. Further, there are many situations in which the exchange of routing information using the DTN technology occurs; however, one of the situations is described and other types of exchange will be omitted.

Figure 20:
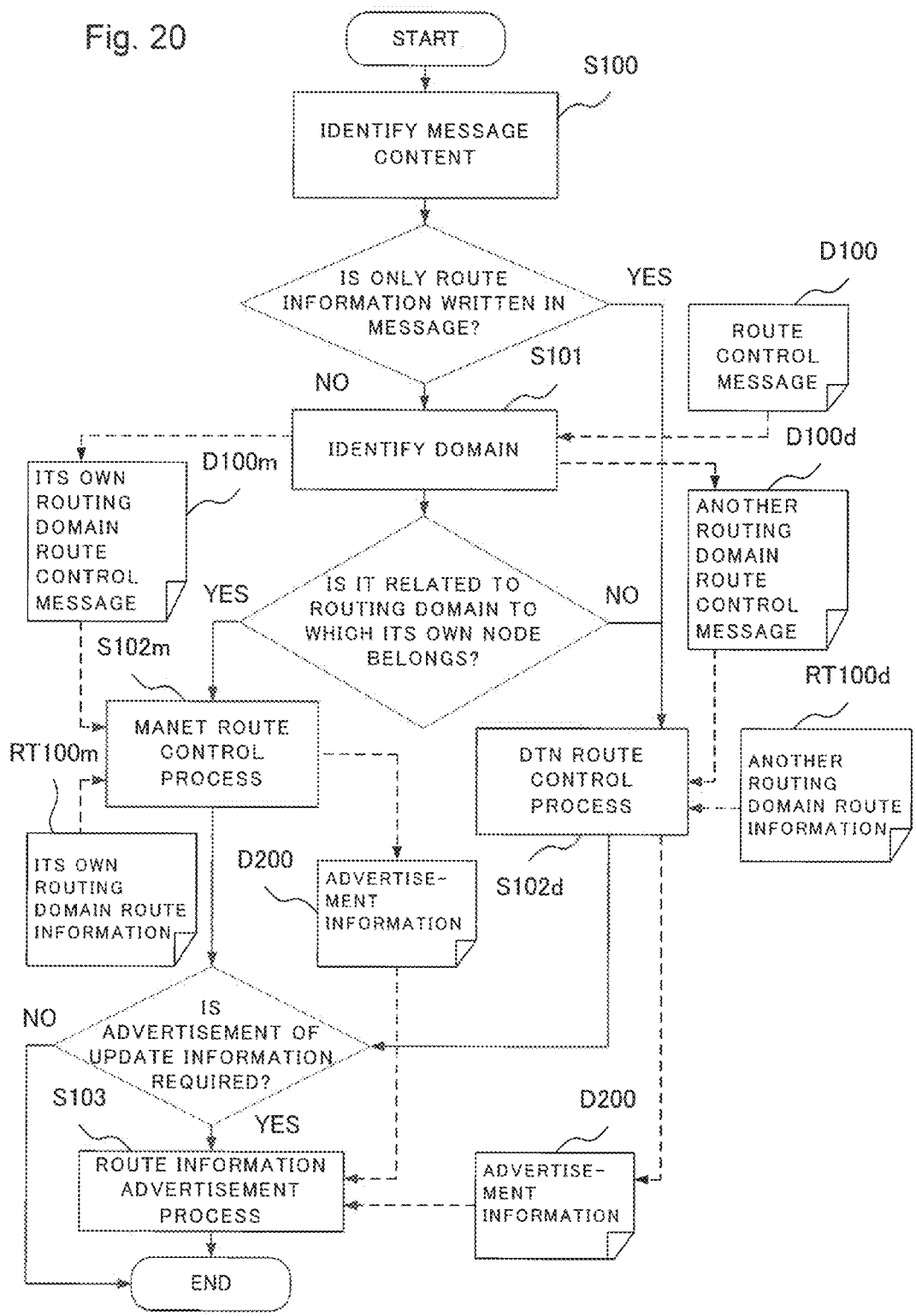
FIG. 20 is a diagram for explaining state transition of a hierarchical structure in the present application.
Figure 21:
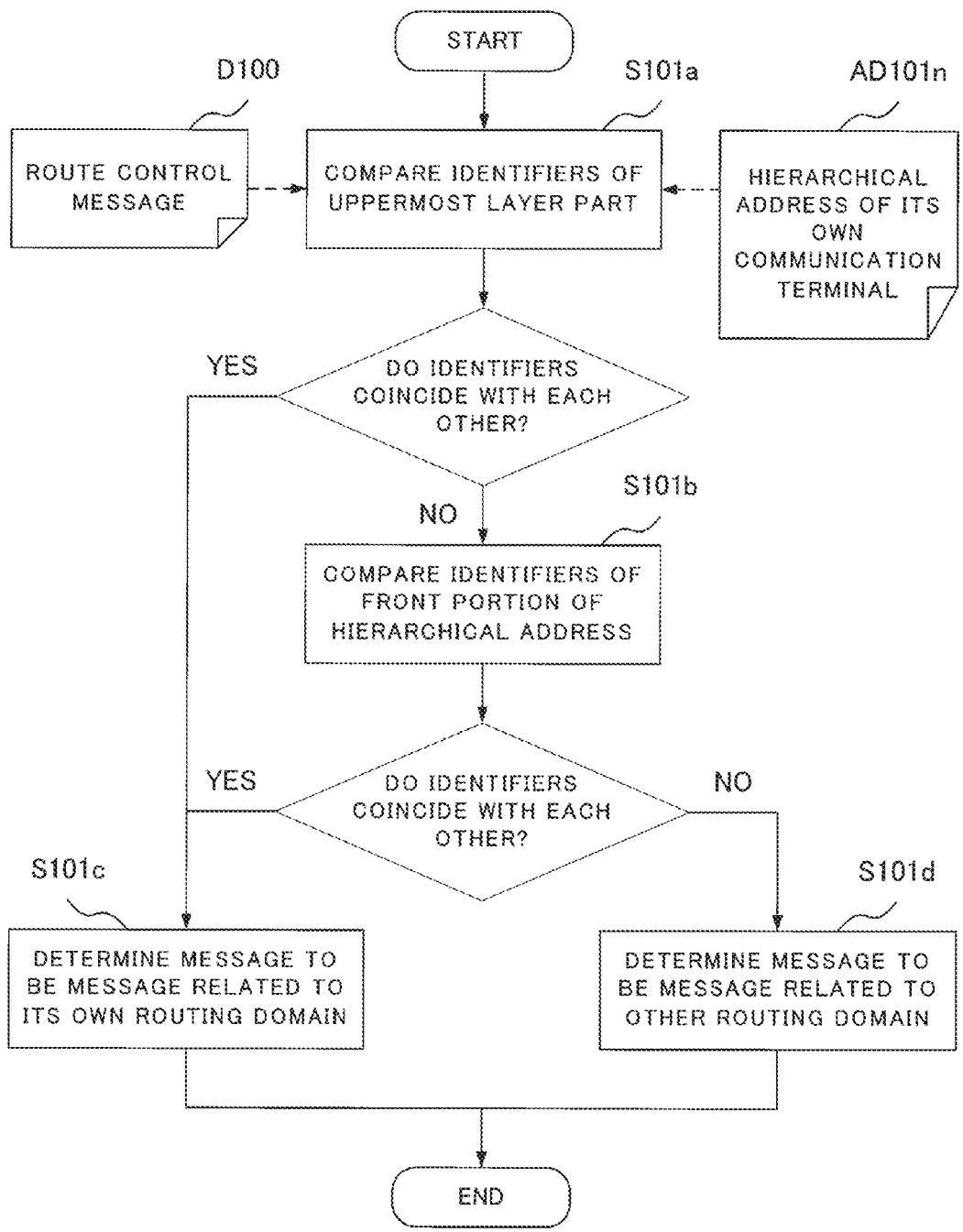
FIG. 21 is a diagram for explaining state transition of a hierarchical structure in the present application.

In the aforementioned situation, with reference to FIG. 20 and FIG. 21, the following description will be provided for an operation in which the construction of a hierarchical structure is further performed from the state of a hierarchical structure illustrated in FIG. 17 and the uppermost management terminal is decided as the terminal CHa (FIG. 18), hierarchical addresses of communication terminals in the hierarchical structure are updated (FIG. 19), and respective communication terminals determine the update of the hierarchical addresses at this time and suppress the exchange of routing information using the DTN technology.

The communication terminal CHa, the communication terminal CHc, and the communication terminals CHh to CH1 illustrated in FIG. 17 regularly transmit the route control message D100 with the written hierarchical address AD100 of its own communication terminal, thereby performing the construction of the hierarchical structure while understanding the route information of the MANET. The communication terminal CHa and the communication terminal CHc temporarily serving as the uppermost temporary management terminal further select a communication terminal to serve as an upper management terminal therefrom on the basis of the route control message D100 mutually transmitted, and change a current hierarchical structure to the hierarchical structure illustrated in FIG. 18.

Figure 18:
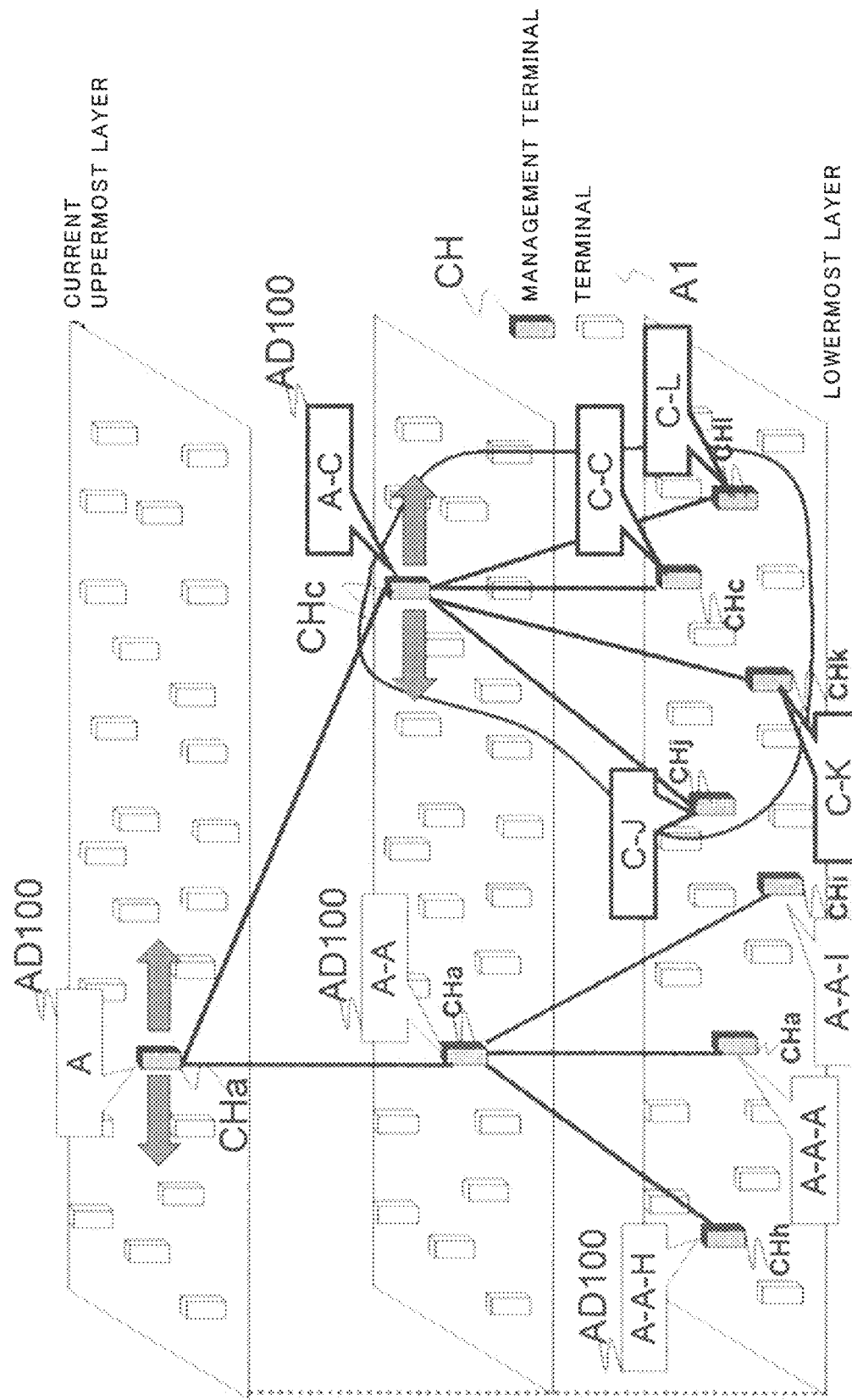
FIG. 18 is a diagram for explaining state transition of a hierarchical structure in the present application.
Figure 19:
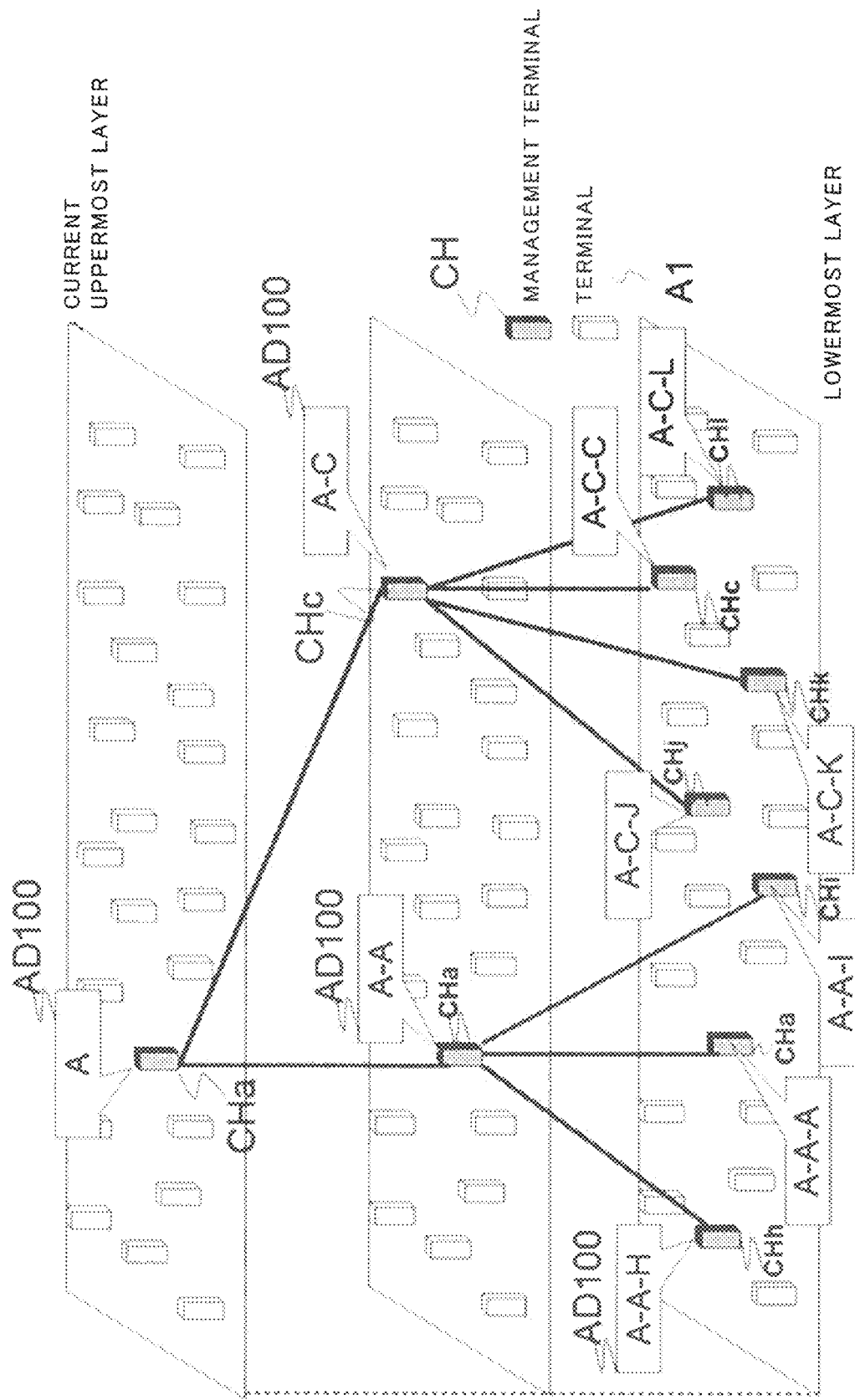
FIG. 19 is a diagram for explaining state transition of a hierarchical structure in the present application.

In FIG. 18, the uppermost management terminal is decided as the communication terminal CHa, and the communication terminal CHc not selected as the uppermost management terminal updates the hierarchical address of its own communication terminal from "C" to "A-C" on the basis of the hierarchical address written in the route control message transmitted by the communication terminal CHa. Then, the communication terminal CHc regularly starts to transmit a route control message with a newly written hierarchical address, thereby allowing neighboring communication terminals to recognize the hierarchical address of its own communication terminal.

Since the communication terminals CHj to CH1, which are management terminals of a lower layer of its own communication terminal CHc, and the communication terminal CHc exist in a range in which they can receive the route control message D100 of the communication terminal CHc, they receive the route control message with the written hierarchical address "A-C".

A step of route information exchange will be described employing the communication terminal CHj of the communication terminals that receive the route control message as example.

When the route control message D100 with the written hierarchical address "A-C" is received from the communication terminal CHc, the communication terminal CHj starts the process of step S100 illustrated in FIG. 20.

In step S100, the communication terminal CHj determines whether the received route control message D100 is the route control message D100h with the written hierarchical address or a route information message with only written route information by using the route control determination unit A130.

When only the route information has been written, the communication terminal CHj proceeds to step S102d to perform an update process of the route information by using the DTN route control unit A132. At this time, when advertisement of update information is required, the communication terminal CHj performs a route information advertisement process of step S103 and ends a route information exchange process.

When the received route control message D100 is the route control message D100h with the written hierarchical address, the communication terminal CHj proceeds to step S101 and performs a domain identification process regarding whether the received route control message D100h is the route control message D100m related to its own routing domain or the route control message D100d related to the other routing domain.

In step S101, the communication terminal CHj performs the procedure as illustrated in FIG. 21, thereby identifying the domain of the route control message D100h. In step S101, the communication terminal CHj firstly performs a process of step S101a illustrated in FIG. 21.

In step S101a, the communication terminal CHj compares the hierarchical address AD100 written in the received route control message D100h with an identifier TAD100 of a part indicating the uppermost layer of the hierarchical address of its own communication terminal.

When the identifiers coincide with each other, the communication terminal CHj proceeds to a process of step S101c to notify the route control determination unit A130 of an identification result of the route control message D100m related to its own routing domain, and ends the process of step S101.

In the present exemplary embodiment, since the hierarchical address AD100 of the communication terminal CHj is "C-J" when the route control message D100h (the hierarchical address A-C) with the written hierarchical address has been received from the communication terminal CHc and the identifiers AD100t of the uppermost parts are "C" and "A" and do not coincide with each other, the communication terminal CHj starts a process of next step S101b.

In step S101b, the communication terminal CHj performs comparison of an identifier AD100s of a part indicating a layer of a transmission source communication terminal of the hierarchical address AD100 in the hierarchical address AD100 written in the received route control message D100h and a hierarchical address AD110 (FIG. 22) of another terminal recognized by its own communication terminal.

When the identifiers coincide with each other, the communication terminal CHj proceeds to a process of step S101c to notify the route control determination unit A130 of the identification result of the route control message D100m related to its own routing domain, and ends the process of step S101.

When the identifiers do not coincide with each other, the communication terminal CHj starts a process of next step S101d. In step S101d, the communication terminal CHj notifies the route control determination unit A130 of an identification result indicating that the received route control message D100h with the written hierarchical address is the route control message D100d related to the other routing domain, and ends the process of step S101.

At this time, when the identifiers do not coincide with each other, the communication terminal CHj may further perform a determination process based on a hierarchical level, and may further limit determination of the other routing domain in which the exchange of routing information using the DTN technology is performed.

Figure 22:
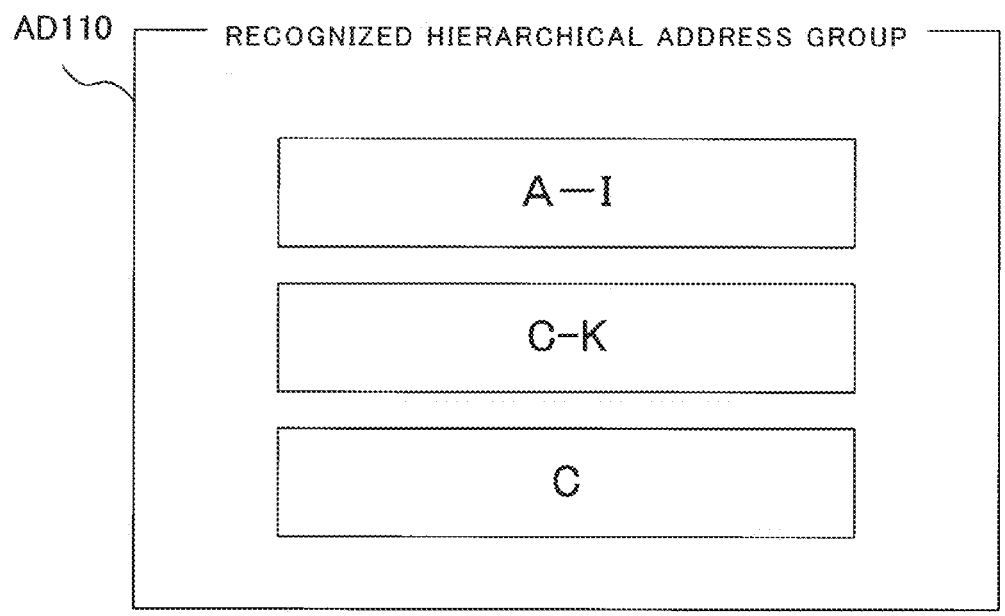
FIG. 22 is a diagram for explaining a recognized hierarchical address group.

In the present exemplary embodiment, since the identifier AD100s indicating the layer of the transmission source communication terminal of the hierarchical address AD100 written in the received route control message D100h is "C" and this identifier coincides with the hierarchical address "C" of the hierarchical address group AD110 of another communication terminal recognized by the terminal CHj illustrated in FIG. 22, the communication terminal CHj determines that the message is the route control message D100m related to its own routing domain and ends the process of step S101.

When the process of step S101 is ended, the communication terminal CHj starts any process of steps S102m and S102d on the basis of the determination result of step S101. The communication terminal CHj performs a process similar to the aforementioned content in the process of step S102d.

In the present exemplary embodiment, in step S101, since it is determined that the message is the route control message D100m related to its own routing domain, the communication terminal CHj performs a process of next step S102.

In the process of step S102, the communication terminal CHj reads the route control message D100h received from the route control determination unit A130 and the route information RT100m of its own routing domain from the route information storage unit A121, and performs update of the route information or hierarchical management. If advertisement of update information is required, the communication terminal CHj performs a process of step S103, and if the advertisement of the update information is not required, the communication terminal CHj ends the exchange process of the route information.

In step S103, the communication terminal CHj advertises the advertisement information D200 received from the MANET route control unit A133 to other communication terminals by using the route information advertisement unit A134. Then, the communication terminal CHj ends the route information exchange process.

As described above, in step S101 of FIG. 20, the domain identification process S101 illustrated in FIG. 21 is performed, so that it is possible to reduce determination of "the route control message from the other routing domain" which is the exchange start condition of the route information using the DTN technology, and thus it is possible to reduce the exchange of the route information.

According to the present invention, in a step of constructing a hierarchical structure in a network, it is possible to reduce wasteful exchange of route information between different routing domains. The reason for this is because it is possible to identify whether hierarchical information advertised from other communication terminals is update information related to its own routing domain which is a hierarchical structure to which its own communication terminal belongs, thereby determining an appropriate exchange timing of route information.

(Supplementary Note 1)

A route information exchange method including a communication node identifies whether a routing domain to which an adjacent communication node belongs is a routing domain of its own communication node by using an identifier indicating a communication node of the uppermost layer and an identifier indicating a transmission source communication node among management communication node identifiers, which are written in hierarchical information included in a route control message received from the adjacent communication node and hierarchical information held by its own communication node and indicate communication nodes that manage each layer of a hierarchical network structure, and the communication node advertises route information held by its own communication node when the routing domain to which the adjacent communication node belongs is different from the routing domain of its own communication node.

(Supplementary Note 2)

The route information exchange method according to Supplementary note 1, wherein, when the routing domain to which the adjacent communication node belongs is equal to the routing domain of its own communication node as an identification result of the routing domains, the communication node does not advertise the route information held by its own communication node.

(Supplementary Note 3)

The route information exchange method according to any one of Supplementary notes 1 and 2, wherein, in the identification of the routing domains, among the identifiers, which are written in the hierarchical information included in the route control message and the hierarchical information of its own communication node and indicate the communication nodes that manage each layer of the hierarchical network structure, when identifiers indicating communication nodes of the uppermost layer coincide with each other, the routing domains are determined to be equal to each other.

(Supplementary Note 4)

The route information exchange method according to any one of Supplementary notes 1 to 3, wherein, in the identification of the routing domains, when the management communication node identifier coincides with the identifier indicating the transmission source communication node, the routing domains are determined to be equal to each other.

(Supplementary Note 5)

The route information exchange method according to any one of Supplementary notes 1 to 4, wherein, in the identification of the routing domains, it is determined whether a layer in which the communication node is positioned is the uppermost layer by using the management communication node identifiers and information of depth of the layer in which the communication node is positioned, and when the layer is the uppermost layer as a determination result, the routing domains are determined to be equal to each other.

(Supplementary Note 6)

The route information exchange method according to any one of Supplementary notes 1 to 5, wherein in a communication node that manages the hierarchical network structure, the hierarchical information includes an identifier of the node and hierarchical information of an upper management node, and is recursively generated toward a lower management node from the uppermost management node.

(Supplementary Note 7)

The route information exchange method according to any one of Supplementary notes 1 to 6, wherein the hierarchical network structure includes a plurality of communication nodes that manage each layer, and includes a tree structure in which a communication node that manages the uppermost layer is employed as a vertex.

(Supplementary Note 8)

A communication node including an identification means that identifies whether a routing domain to which an adjacent communication node belongs is a routing domain of its own communication node by using an identifier indicating a communication node of the uppermost layer and an identifier indicating a transmission source communication node among management communication node identifiers, which are written in hierarchical information included in a route control message received from the adjacent communication node and hierarchical information held by its own communication node and indicate communication nodes that manage each layer of a hierarchical network structure, and an advertisement means that advertises route information held by its own communication node when the routing domain to which the adjacent communication node belongs is different from the routing domain of its own communication node.

(Supplementary Note 9)

The communication node according to Supplementary note 8, wherein, when the routing domain to which the adjacent communication node belongs is equal to the routing domain of its own communication node as an identification result of the routing domains, the communication node does not advertise the route information held by its own communication node.

(Supplementary Note 10)

The communication node according to Supplementary note 8 or 9, wherein, in the identification of the routing domains, among the identifiers, which are written in the hierarchical information included in the route control message and the hierarchical information of its own communication node and indicate the communication nodes that manage each layer of the hierarchical network structure, when identifiers indicating communication nodes of the uppermost layer coincide with each other, the routing domains are determined to be equal to each other.

(Supplementary Note 11)

The communication node according to any one of Supplementary notes 8 to 10, wherein, in the identification of the routing domains, when the management communication node identifier coincides with the identifier indicating the transmission source communication node, the routing domains are determined to be equal to each other.

(Supplementary Note 12)

The communication node according to any one of Supplementary notes 8 to 11, wherein, in the identification of the routing domains, it is determined whether a layer in which the communication node is positioned is the uppermost layer by using the management communication node identifiers and information of depth of the layer in which the communication node is positioned, and when the layer is the uppermost layer as a determination result, the routing domains are determined to be equal to each other.

(Supplementary Note 13)

The communication node according to any one of Supplementary notes 8 to 12, wherein in a communication node that manages the hierarchical network structure, the hierarchical information includes an identifier of the node and hierarchical information of an upper management node, and is recursively generated toward a lower management node from the uppermost management node.

(Supplementary Note 14)

The communication node according to any one of Supplementary notes 8 to 13, wherein the hierarchical network structure includes a plurality of communication nodes that manage each layer, and includes a tree structure in which a communication node that manages the uppermost layer is employed as a vertex.

(Supplementary Note 15)

A communication system including an identification means that identifies whether a routing domain to which an adjacent communication node belongs is a routing domain of its own communication node by using an identifier indicating a communication node of the uppermost layer and an identifier indicating a transmission source communication node among management communication node identifiers, which are written in hierarchical information included in a route control message received from the adjacent communication node and hierarchical information held by its own communication node and indicate communication nodes that manage each layer of a hierarchical network structure, and an advertisement means that advertises route information held by its own communication node when the routing domain to which the adjacent communication node belongs is different from the routing domain of its own communication node.

(Supplementary Note 16)

The communication system according to Supplementary note 15, wherein, when the routing domain to which the adjacent communication node belongs is equal to the routing domain of its own communication node as an identification result of the routing domains, the communication node does not advertise the route information held by its own communication node.

(Supplementary Note 17)

The communication system according to Supplementary note 15 or 16, wherein, in the identification of the routing domains, among the identifiers, which are written in the hierarchical information included in the route control message and the hierarchical information of its own communication node and indicate the communication nodes that manage each layer of the hierarchical network structure, when identifiers indicating communication nodes of the uppermost layer coincide with each other, the routing domains are determined to be equal to each other.

(Supplementary Note 18)

The communication system according to any one of Supplementary notes 15 to 17, wherein, in the identification of the routing domains, when the management communication node identifier coincides with the identifier indicating the transmission source communication node, the routing domains are determined to be equal to each other.

(Supplementary Note 19)

The communication system according to any one of Supplementary notes 15 to 18, wherein, in the identification of the routing domains, it is determined whether a layer in which the communication node is positioned is the uppermost layer by using the management communication node identifiers and information of depth of the layer in which the communication node is positioned, and when the layer is the uppermost layer as a determination result, the routing domains are determined to be equal to each other.

(Supplementary Note 20)

The communication system according to any one of Supplementary notes 15 to 19, wherein in a communication node that manages the hierarchical network structure, the hierarchical information includes an identifier of the node and hierarchical information of an upper management node, and is recursively generated toward a lower management node from the uppermost management node.

(Supplementary Note 21)

The communication system according to any one of Supplementary notes 15 to 20, wherein the hierarchical network structure includes a plurality of communication nodes that manage each layer, and includes a tree structure in which a communication node that manages the uppermost layer is employed as a vertex.

(Supplementary Note 22)

A program of a communication node causing the communication node to serve as an identification means that identifies whether a routing domain to which an adjacent communication node belongs is a routing domain of its own communication node by using an identifier indicating a communication node of the uppermost layer and an identifier indicating a transmission source communication node among management communication node identifiers, which are written in hierarchical information included in a route control message received from the adjacent communication node and hierarchical information held by its own communication node and indicate communication nodes that manage each layer of a hierarchical network structure, and an advertisement means that advertises route information held by its own communication node when the routing domain to which the adjacent communication node belongs is different from the routing domain of its own communication node.

This application is based upon and claims the benefit of priority from Japanese Patent Application No. 2013-042876, filed on Mar. 5, 2013, the disclosure of which is incorporated herein in its entirety by reference.

REFERENCE SIGNS LIST

A1 communication terminal
A11 wireless communication function unit
A111 wireless communication unit
A12 information management unit
A121 route information storage unit
A13 route control unit
A130 route control determination unit
A131 domain identification unit
A132 DTN route control unit
A133 MANET route control unit
A134 route information advertisement unit
L1 wireless communication
CH, CHa, CHc, CHh to CH1 management terminal
CA management range
AD100 hierarchical address
AD100$s$ transmission source terminal identifier of hierarchical address
AD100$t$ identifier indicating uppermost layer of hierarchical address
AD100$n$ hierarchical address of its own terminal
AD110 hierarchical address group of recognized other communication terminals
HL100 hierarchical level
D100 to D105 route control message
D100$m$ route control message related to its own hierarchical structure
D100$d$ route control message related to another hierarchical structure
D100$h$ route control message with written hierarchical address
D200 advertisement information
RT100 route information
RT100$m$ route information of its own routing domain
RT100$d$ route information of another routing domain

What is claimed is:

1. A route information exchange method comprising:
    identifying, by a communication node belonging to a first routing domain, whether an adjacent communication node belongs to the first routing domain by using a first identifier indicating a management communication node of an uppermost layer and a second identifier indicating a transmission source communication node among communication node identifiers, wherein the first identifier and the second identifier are written in hierarchical information included in a route control message received from the adjacent communication node and hierarchical information stored by the communication node and wherein the stored hierarchical information indicates communication nodes that manage each layer of a hierarchical network structure; and
    advertising, by the communication node, route information stored by the communication node when the adjacent communication node does not belong to the first routing domain,
    wherein a managing communication node that manages the hierarchical network structure stores hierarchical information including an identifier of the managing communication node and hierarchical information of an upper management node, and is recursively generated toward a lower management node from the uppermost management node.

2. The route information exchange method according to claim 1, wherein, when the adjacent communication node is identified as belonging to the first routing domain based on an identification result of the identifying, the communication node does not advertise the route information stored by the communication node.

3. The route information exchange method according to claim 1, wherein, in the identifying, among identifiers, which are written in the hierarchical information included in the route control message and the hierarchical information of the communication node and indicate the communication nodes that manage each layer of the hierarchical network structure, when identifiers indicating the communication nodes of the uppermost layer coincide with each other, the routing domains are determined to be equal to each other.

4. The route information exchange method according to claim 1, wherein, in the identifying, when the management communication node identifier coincides with the second identifier indicating the transmission source communication node, the routing domains are determined to be equal to each other.

5. The route information exchange method according to claim 1, wherein, during the identifying, it is determined whether a layer in which the communication node is positioned is the uppermost layer by using the management communication node identifiers and information of depth of the layer in which the communication node is positioned, and when the layer is the uppermost layer is determined as a result, the routing domains are determined to be equal to each other.

6. The route information exchange method according to claim 1, wherein the hierarchical network structure includes a plurality of communication nodes that manage each layer, and includes a tree structure in which a communication node that manages the uppermost layer is employed as a vertex.

7. A communication node belonging to a first routing domain, the communication node comprising:
  at least one processor configured to implement:
    an identification unit configured to identify whether an adjacent communication node belongs to the first routing domain by using a first identifier indicating a management communication node of an uppermost layer and a second identifier indicating a transmission source communication node among communication node identifiers, wherein the first identifier and the second identifier are written in hierarchical information included in a route control message received from the adjacent communication node and hierarchical information stored by the communication node and wherein the stored hierarchical information indicates communication nodes that manage each layer of a hierarchical network structure; and
  an advertisement unit configured to advertise route information stored by the communication node when the adjacent communication node does not belong to the first routing domain.

8. A communication system comprising:
  at least one processor configured to implement:
  an identification unit of a communication node belonging to a first routing domain, the identification unit being configured to identify whether an adjacent communication node belongs to the first routing domain by using a first identifier indicating a management communication node of an uppermost layer and a second identifier indicating a transmission source communication node among communication node identifiers, wherein the first identifier and the second identifier are written in hierarchical information included in a route control message received from the adjacent communication node and hierarchical information stored by the communication node and wherein the stored hierarchical information indicates communication nodes that manage each layer of a hierarchical network structure; and
  an advertisement unit configured to advertise route information stored by the communication node when the adjacent communication node does not belong to the first routing domain.

* * * * *